United States Patent
Kai et al.

(10) Patent No.: US 9,050,900 B2
(45) Date of Patent: Jun. 9, 2015

(54) NON-CONTACT CHARGING DEVICE

(75) Inventors: Toshihiro Kai, Yamato (JP); Kraisorn Throngnumchai, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 142 days.

(21) Appl. No.: 13/976,169

(22) PCT Filed: Nov. 16, 2011

(86) PCT No.: PCT/JP2011/076427
§ 371 (c)(1),
(2), (4) Date: Jun. 26, 2013

(87) PCT Pub. No.: WO2012/090612
PCT Pub. Date: Jul. 5, 2012

(65) Prior Publication Data
US 2013/0278212 A1    Oct. 24, 2013

(30) Foreign Application Priority Data

Dec. 27, 2010  (JP) ................................. 2010-290133

(51) Int. Cl.
| | |
|---|---|
| G06F 17/50 | (2006.01) |
| B60L 11/18 | (2006.01) |
| H01M 10/44 | (2006.01) |
| H02J 7/02 | (2006.01) |
| H02J 5/00 | (2006.01) |

(52) U.S. Cl.
CPC ........... B60L 11/1829 (2013.01); B60L 11/182 (2013.01); B60L 11/1833 (2013.01); H01M 10/44 (2013.01); H02J 7/025 (2013.01); *Y02T 90/122* (2013.01); *Y02T 10/7005* (2013.01); *Y02T 90/125* (2013.01); *Y02T 90/14* (2013.01); B60L 11/1846 (2013.01); B60L 11/1861 (2013.01); *B60L 2210/30* (2013.01); *B60L 2240/545* (2013.01); *B60L 2240/622* (2013.01); *B60L 2240/80* (2013.01); *B60L 2250/16* (2013.01); *Y02T 10/7044* (2013.01); *Y02T 10/705* (2013.01); *Y02T 10/7241* (2013.01);
(Continued)

(58) Field of Classification Search
USPC ......................................................... 320/108
See application file for complete search history.

(56) References Cited

U.S. PATENT DOCUMENTS

| | | | |
|---|---|---|---|
| 6,239,577 B1 * | 5/2001 | Koike et al. | ................... 320/108 |
| 7,795,841 B2 | 9/2010 | Matsumoto | |

(Continued)

FOREIGN PATENT DOCUMENTS

| | | |
|---|---|---|
| CN | 101764434 A | 6/2010 |
| CN | 101878576 A | 11/2010 |

(Continued)

OTHER PUBLICATIONS

Chinese Office Action, Jan. 12, 2015, 8 pages.

*Primary Examiner* — Suchin Parihar
(74) *Attorney, Agent, or Firm* — Foley & Lardner LLP

(57) ABSTRACT

A non-contact charging device includes a power receiving device having at least a power receiving coil 1B which receives electric power from a power transmitting coil 1A in a non-contact manner by magnetic coupling; a battery 5 which is charged by the electric power; a state-of-charge detection unit for detecting the state of charge of the battery 5; and a permissible charging range setting unit for setting a permissible charging range indicating the range of the position of the power transmitting coil 1A relative to the position of the power receiving coil 1B, in which the charging of the battery 5 is permitted, according to the state of charge detected by the state-of-charge detection unit.

6 Claims, 19 Drawing Sheets

(52) U.S. Cl.
 CPC ............... *Y02T 90/16* (2013.01); *Y02T 90/162* (2013.01); *Y02T 90/163* (2013.01); *Y02T 90/169* (2013.01); *Y02T 90/128* (2013.01); *Y02T 90/127* (2013.01); *Y04S 30/14* (2013.01); *H02J 5/005* (2013.01); *Y02T 10/7291* (2013.01); *Y02T 90/121* (2013.01)

(56) References Cited

U.S. PATENT DOCUMENTS

| | | | |
|---|---|---|---|
| 8,504,227 | B2 | 8/2013 | Ichishi |
| 8,947,047 | B2 * | 2/2015 | Partovi et al. ................. 320/108 |
| 2006/0284593 | A1 * | 12/2006 | Nagy et al. .................... 320/109 |
| 2009/0096413 | A1 * | 4/2009 | Partovi et al. ................. 320/108 |
| 2010/0161217 | A1 | 6/2010 | Yamamoto |
| 2010/0217485 | A1 | 8/2010 | Ichishi |
| 2013/0038272 | A1 * | 2/2013 | Sagata ........................... 320/106 |
| 2014/0111152 | A1 * | 4/2014 | Kai et al. ....................... 320/108 |

FOREIGN PATENT DOCUMENTS

| | | |
|---|---|---|
| JP | 11-341694 A | 12/1999 |
| JP | 2009-89452 A | 4/2009 |
| JP | 2010-172185 A | 8/2010 |
| JP | 2010-268665 A | 11/2010 |

\* cited by examiner

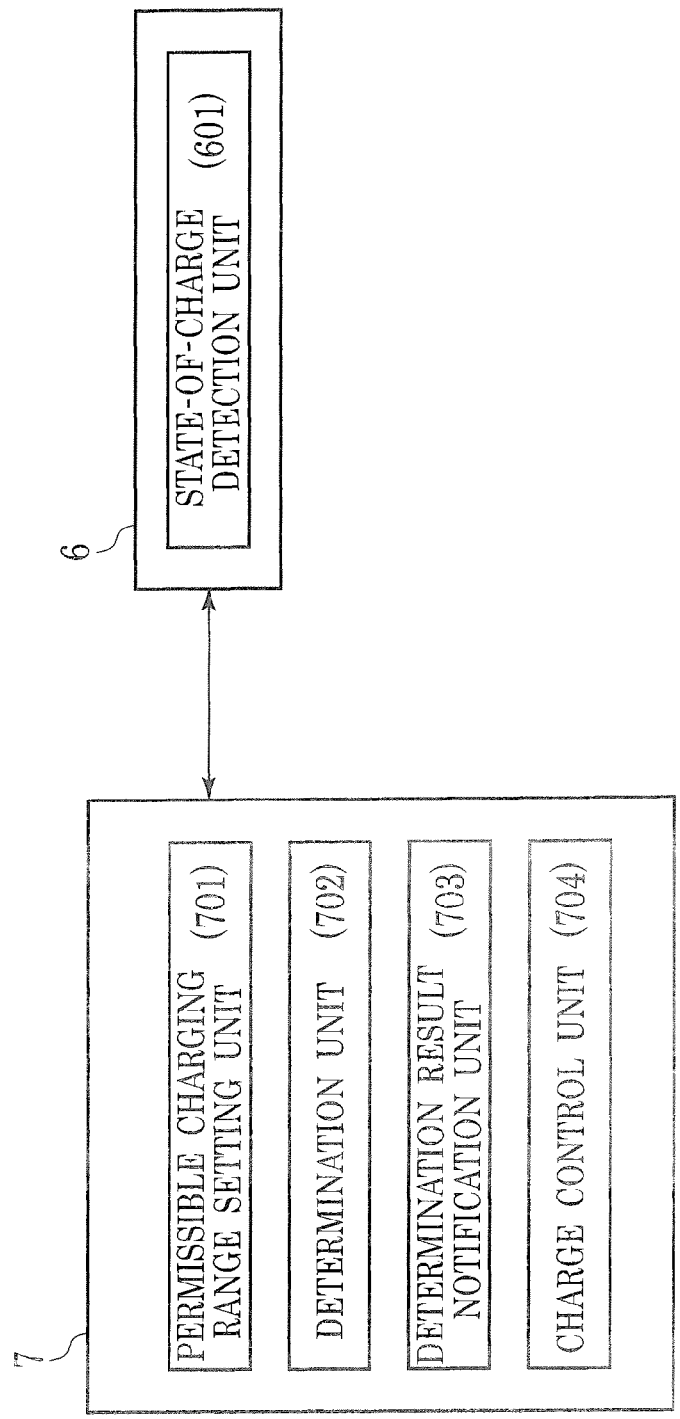

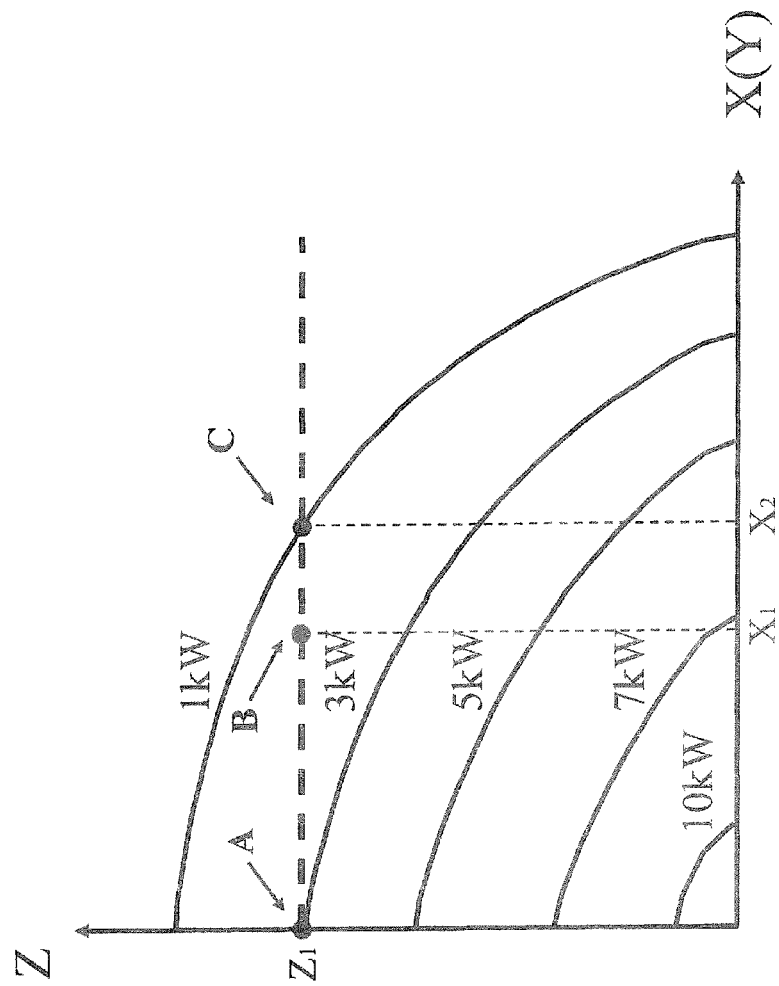

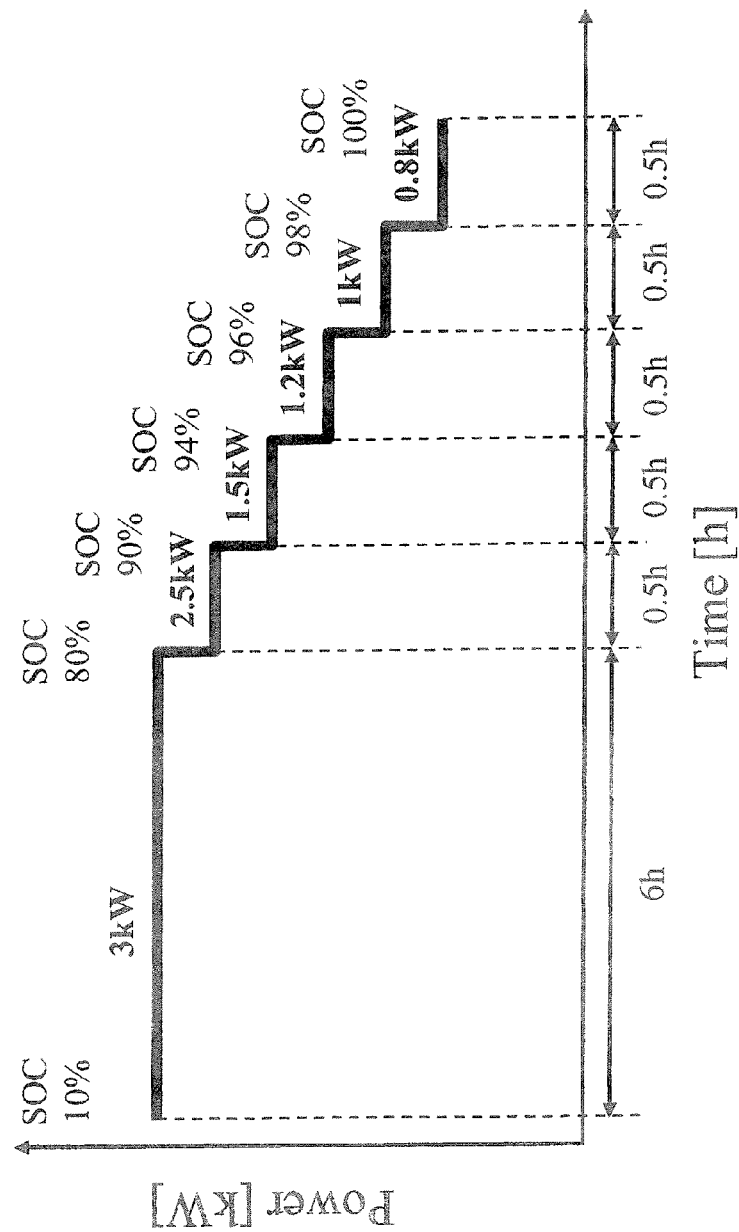

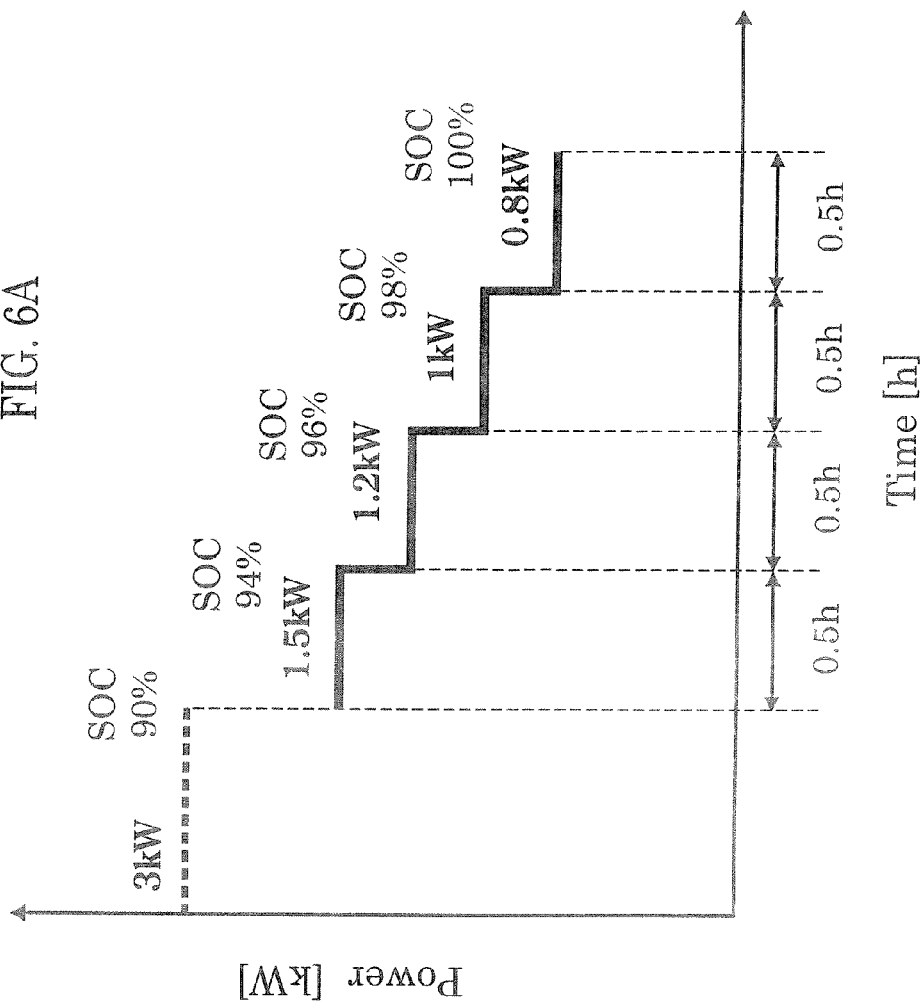

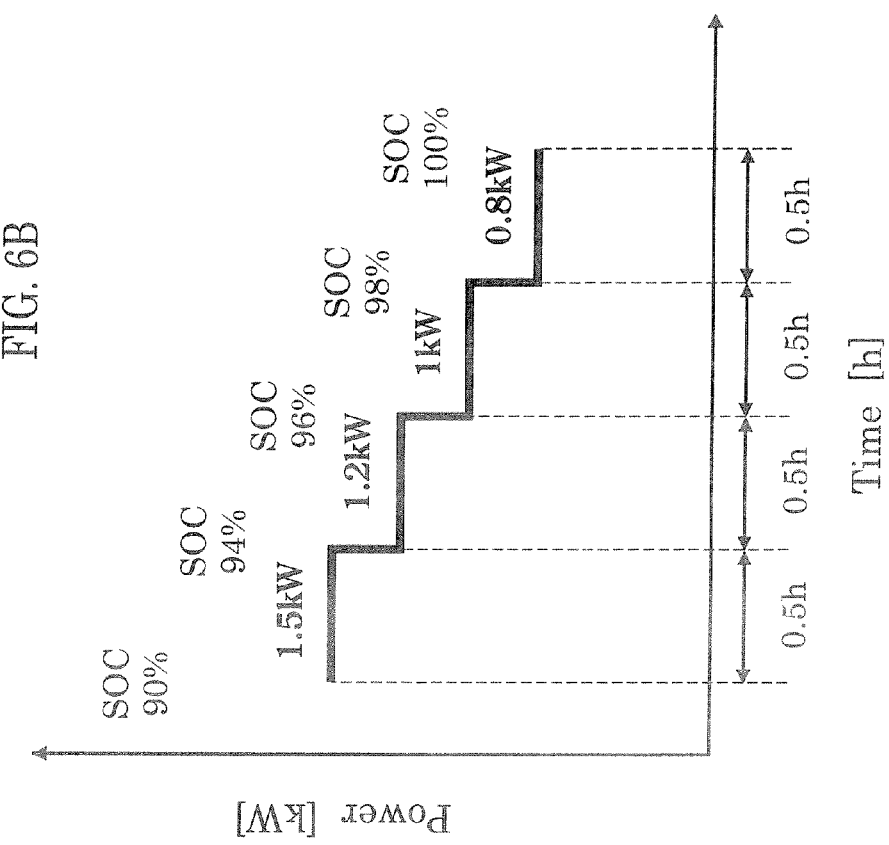

NON-CONTACT CHARGING DEVICE

FIELD OF INVENTION

The present invention relates to a non-contact charging device.

This application is based upon and claims the benefit of priority of Japanese Patent Application No. 2010-290133, filed on Dec. 27, 2010, the entire contents of which are incorporated herein as part of the description by reference as for the designated countries where incorporation of document by reference is approved.

BACKGROUND ART

There has been known a charging system including a charging device preinstalled in the vicinity of a vehicle stop position and configured to charge a battery mounted on a vehicle, when the vehicle is stopped at the predetermined position; a mobile unit carried by a driver of the vehicle and having a communication function; a vehicle-side communication unit mounted on the vehicle and configured to communicate with the mobile unit; and a battery charge control unit mounted on the vehicle and configured to start charging of the battery when a determination is made that the driver is moving away from the vehicle, or to terminate charging of the battery when a determination is made that the driver is approaching the vehicle, based on results obtained by the vehicle-side communication unit communicating with the mobile unit, in which the battery is charged by transmitting and receiving electric power by electromagnetic coupling between a power receiving unit of the vehicle and a power feeding unit of the charging device, while keeping a non-contact state therebetween (see Patent Literature 1).

CITATION LIST

Patent Literature

Patent Literature 1: Japanese Patent Application Publication No. 2009-089452

SUMMARY OF INVENTION

Technical Problem

However, a determination is not made as to whether or not charging is possible, based on the position of the power receiving unit and the position of a power feeding unit, and hence a user cannot see to what extent displacement of the position of the power feeding unit relative to the position of the power receiving unit is permissible, which in turn leads to the problem of causing inconvenience to the vehicle user.

An object of the present invention is to provide a non-contact charging device which achieves an improvement in user's convenience.

Solution to Problem

In order to solve the foregoing problem, the present invention provides a non-contact charging device including a state-of-charge detection unit for detecting the state of charge of a battery, and a permissible charging range setting unit for setting a permissible charging range indicating the range of the position of a power transmitting coil, according to the state of charge detected by the state-of-charge detection unit.

Advantageous Effects of Invention

According to the present invention, the permissible charging range is set according to the state of charge, or charging time is calculated according to the state of charge and the position of the power transmitting coil, and thereby, for example when the state of charge is high, the amount of electric power required for charging is small and hence the permissible charging range is set correspondingly wide and thus a range in which position displacement of the power transmitting coil is permitted can be widened, or, for example even when the charging time is long due to the position displacement of the power transmitting coil, a user can check the charging time and make a judgment to start the charging, and as a result, user's convenience can be improved.

BRIEF DESCRIPTION OF DRAWINGS

FIG. 2 is a block diagram of a battery controller and an electronic control unit illustrated in FIG. 1.

FIG. 4 illustrates characteristics of receivable power for the power receiving coil 1B in the X-axis direction (or the Y-axis direction) and the direction of the Z axis illustrated in FIGS. 3A and 3B.

FIG. 5A is a graph illustrating characteristics of charging power for a battery 5 with respect to charging time in FIG. 1, illustrating characteristics in the case of charging under a condition where electric power received by the power receiving coil is 3.0 kW.

FIG. 6A is a graph illustrating characteristics of the charging power for the battery 5 with respect to the charging time in FIG. 1, illustrating characteristics in the case of charging under a condition where the electric power received by the power receiving coil is 3.0 kW.

FIG. 6B is a graph illustrating characteristics of the charging power for the battery 5 with respect to the charging time in FIG. 1, illustrating characteristics in the case of charging under a condition where the electric power received by the power receiving coil is 1.5 kW.

DESCRIPTION OF EMBODIMENTS

Non-contact charging devices according to embodiments of the present invention will be described below with reference to the drawings.

[First Embodiment]

Figure 1:
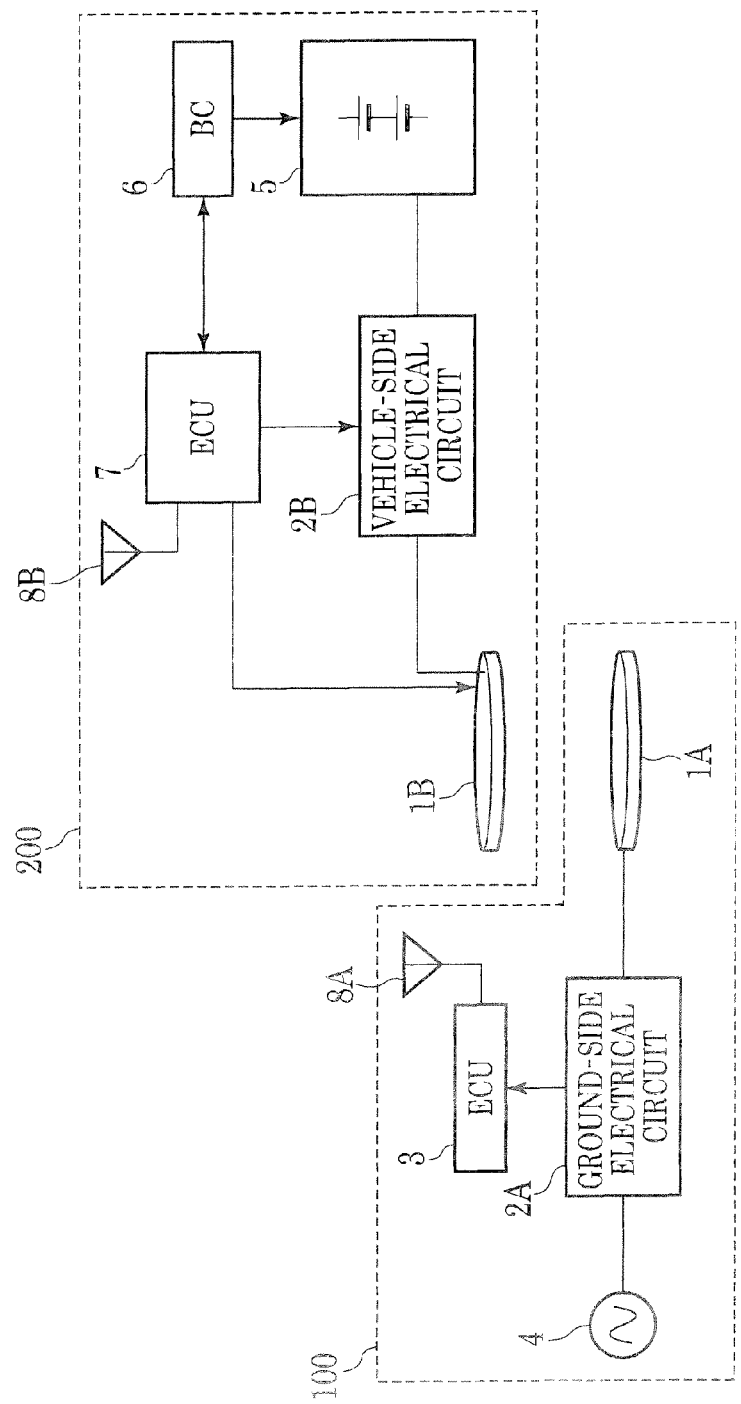
FIG. 1 is a block diagram of a non-contact charging system according to an embodiment of the present invention.

FIG. 1 is a block diagram illustrating a non-contact charging system to which one embodiment of the present invention is applied, and the system includes a ground-side unit 100 and a vehicle-side unit 200 and is configured so that the ground-side unit 100 installed in a power feeding station or the like provides a non-contact supply of power to a load such as a battery 5 of the vehicle-side unit 200 mounted on a vehicle or the like thereby to charge the battery 5. In the first embodiment, the non-contact charging device including the non-contact charging system will hereinbelow be described by way of example as being mounted on a charging device provided in an electric vehicle and a parking space for the vehicle; however, the non-contact charging device including the non-contact charging system of the first embodiment may be provided in a vehicle other than the electric vehicle, or may be provided in other than the vehicle.

The ground-side unit 100 includes a power transmitting coil 1A, a ground-side electrical circuit 2A, an electronic control unit (ECU) 3, a system power supply 4, and a ground-side communication device 8A. The system power supply 4 supplies AC power to the ground-side electrical circuit 2A. The ground-side electrical circuit 2A is a circuit including a rectifier, a power converter, a resonant circuit, and the like, and converts the AC power transmitted from the system power supply 4 into an AC wave of AC power and transmits the converted AC power to the power transmitting coil 1A. The power transmitting coil 1A transmits high-frequency power to a power receiving coil 1B by an electromagnetic induction action with the coils being in their non-contact state. The power transmitting coil 1A is provided in the parking space in a parking area in which the non-contact charging system of the first embodiment is provided. When the vehicle provided with the vehicle-side unit 200 is parked in the parking space, the power transmitting coil 1A is located under the power receiving coil 1B, while keeping a distance from the power receiving coil 1B. The ECU 3 is a controller for controlling the overall ground-side unit 100, and controls the ground-side electrical circuit 2A for example to start and terminate transmission of electric power from the power transmitting coil 1A to the power receiving coil 1B and thereby adjust the electric power to be transmitted from the power transmitting coil 1A. The ground-side communication device 8A communicates with a vehicle-side communication device 8B thereby to transmit the timing of power transmission, transmitted power or the like to the vehicle-side unit 200, under a control signal from the ECU 3. Also, the ground-side communication device 8A transmits the position of the power transmitting coil 1A to the vehicle-side unit 200.

The vehicle-side unit 200 includes the power receiving coil 1B, a vehicle-side electrical circuit 2B, the battery 5, an electronic control unit (ECU) 7, a battery controller (BC) 6, and the vehicle-side communication device 8B. The power receiving coil 1B is a coil which receives high-frequency power transmitted from the power transmitting coil 1A by an electromagnetic induction action with the coils being in their non-contact state, and is provided on a bottom surface (or a chassis) or the like of the vehicle provided with the vehicle-side unit 200. The vehicle-side electrical circuit 2B is a circuit including a resonant circuit, a rectifier, a junction block (J/B), and the like, and converts electric power transmitted from the power receiving coil 1B and supplies the electric power to the battery 5 thereby to charge the battery 5. In other words, the vehicle-side electrical circuit 2B has the function of a charger for charging the battery 5. The battery 5 is a battery formed of a connection of plural secondary batteries, and serves as a power source for the vehicle provided with the vehicle-side unit 200. The BC 6 is a controller for managing the battery 5 and detects the state of charge (SOC) of the battery 5, the remaining capacity of the battery 5, or the like. The ECU 7 is a controller for performing centralized control on the power receiving coil 1B, the vehicle-side electrical circuit 2B and the BC 6, and controls the vehicle-side electrical circuit 2B to manage charging of the battery 5 according to the state of the battery 5 under management by the BC 6. The vehicle-side communication device 8B communicates with the ground-side communication device 8A thereby to receive position information indicating the position of the power transmitting coil 1A, information on electric power transmitted from the power transmitting coil 1A, or the like, and transmits the received information to the ECU 7.

Next, configurations of the BC 6 and the ECU 7 will be described with reference to FIG. 2. FIG. 2 is a block diagram illustrating the configurations of the BC 6 and the ECU 7. The BC 6 includes a state-of-charge detection unit 601. The state-of-charge detection unit 601 detects the SOC of the battery 5. The SOC has a correlation with voltage of the battery 5, and thus, the state-of-charge detection unit 601 can detect the SOC of the battery 5 by detecting the voltage of the battery 5. Information on the SOC of the battery 5 detected by the state-of-charge detection unit 601 is transmitted to the ECU 7.

The ECU 7 includes a permissible charging range setting unit 701, a determination unit 702, a determination result notification unit 703, and a charge control unit 704. The permissible charging range setting unit 701 sets a permissible charging range according to the SOC detected by the state-of-charge detection unit 601. The permissible charging range indicates the range of the position of the power transmitting coil 1A relative to the position of the power receiving coil 1B, in which the charging of the battery 5 is permitted. The power transmitting coil 1A is provided in the ground-side unit 100 and the power receiving coil 1B is provided in the vehicle-side unit 200, and therefore, the position of the power transmitting coil 1A relative to the position of the power receiving coil 1B varies according to the parked position of the vehicle. In the first embodiment, the permissible charging range is set as criterion for the relative positions of the coils at which the charging of the battery 5 is permitted when the vehicle is parked in the parking space, as described later.

The determination unit 702 determines whether or not the charging of the battery 5 is permitted, according to the position of the power transmitting coil 1A relative to the position of the power receiving coil 1B. In the parked position of the vehicle, the charging is permitted if the position of the power transmitting coil 1A falls within the permissible charging range, or the charging is not permitted if the position of the power transmitting coil 1A falls outside the permissible charging range. The determination result notification unit 703 notifies a user of results determined by the determination unit 702, for example by a navigation system (unillustrated) provided on an instrument panel, or by voice or the like.

For the charging of the battery 5, here, optimum power for the charging is preset according to the SOC, and is set so as to become smaller as the SOC gets closer to full charge. Then, the BC 6, which manages the SOC of the battery 5, makes a request to the charge control unit 704 for necessary power for the charging, based on a preset mode of charging. Then, the charge control unit 704 controls electric power which the vehicle-side electrical circuit 2B outputs to the battery 5 at the time of the charging of the battery 5, according to the power requested by the BC 6, thereby to reduce in a stepwise fashion the output power from the vehicle-side electrical circuit 2B as the value of the SOC of the battery 5 becomes higher, thus limiting the charging power for the battery 5. Specifically, under control of the charge control unit 704, the charging of the battery 5 by the charger of the vehicle-side electrical circuit 2B is accomplished for example by a mode of charging which starts with constant current charging and switches to multistage constant current charging or multistage constant voltage charging.

Next, description will be given with reference to FIGS. 3 and 4 with regard to the fact that electric power received by the power receiving coil 1B varies according to the relative positions of the power transmitting coil 1A and the power receiving coil 1B. FIGS. 3A and 3B each illustrate, in a plan view a) and perspective views b), c), the power transmitting coil 1A and the power receiving coil 1B as facing each other. In FIGS. 3A and 3B, the X axis and the Y axis indicate the two-dimensional directions of the power transmitting coil 1A and the power receiving coil 1B, and the Z axis indicates the height direction thereof. Incidentally, both the power transmitting coil 1A and the power receiving coil 1B are of the same circular shape for the sake of the description; however, in the first embodiment, the power transmitting coil 1A and the power receiving coil 1B are neither necessarily required to be in circular form nor required to be identical in shape.

Figure 3A:
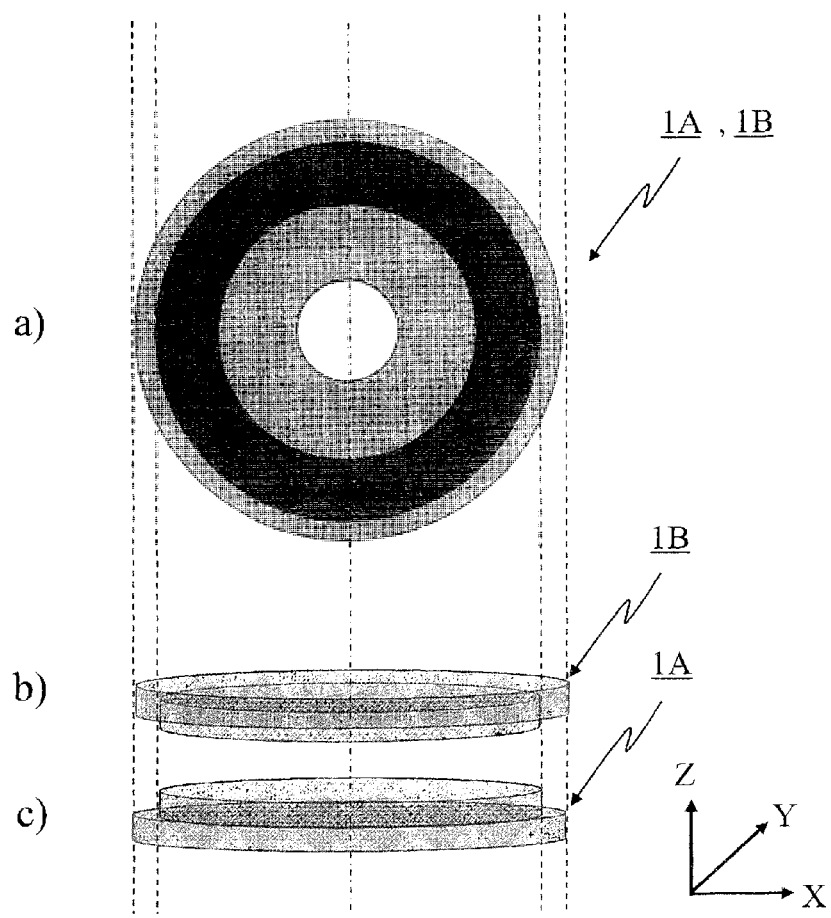
FIG. 3A is a plan view and perspective views illustrating a power transmitting coil and a power receiving coil of FIG. 1 as facing each other.
Figure 3B:
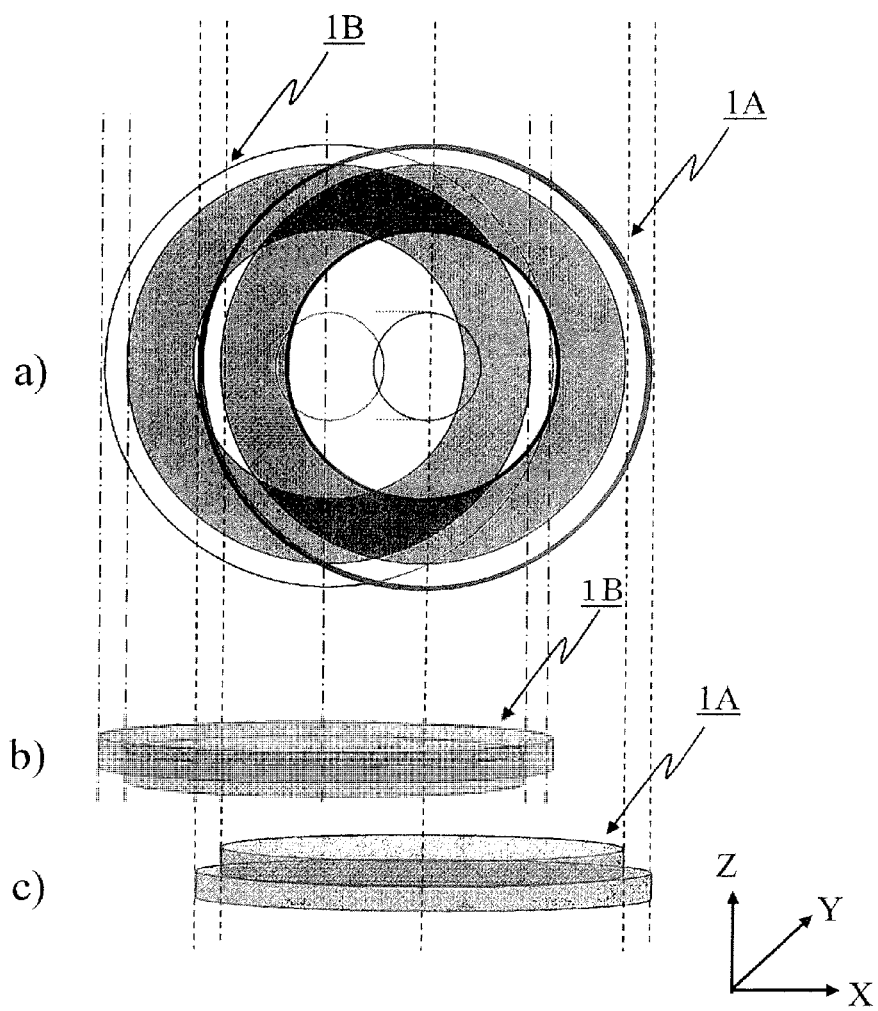
FIG. 3B is a plan view and perspective views illustrating the power transmitting coil and the power receiving coil of FIG. 1 as facing each other, illustrating the coils as displaced from each other in the X-axis direction.

Now, when the power transmitting coil 1A is provided on the ground and the power receiving coil 1B is mounted on the vehicle, as illustrated in FIG. 3A, it is desirable that the vehicle be parked in the parking space in such a manner that the power receiving coil 1B coincides with the power transmitting coil 1A in the X-axis and Y-axis directions as the two-dimensional directions; however, as illustrated in FIG. 3B, the relative positions of the power transmitting coil 1A and the power receiving coil 1B may be displaced from each other in the two-dimensional directions, depending on driver's skill. Also, the height of the vehicle varies according to the type of vehicle or the amount of loading, and therefore, a distance between the power transmitting coil 1A and the power receiving coil 1B in the height direction Z varies also according to the vehicle height.

With a constant electric power being supplied from the ground-side electrical circuit 2A to the power transmitting coil 1A, the efficiency of reception of electric power by the power receiving coil 1B is highest when the power receiving coil 1B is in a position coinciding with the power transmitting coil 1A (which corresponds to a position illustrated in FIG. 3A), while the efficiency is low when a point of center of the power receiving coil 1B is far away from a point of center of the power transmitting coil 1A.

FIG. 4 illustrates characteristics of receivable power for the power receiving coil 1B in the X-axis direction (or the Y-axis direction) and the direction of the Z axis illustrated in FIGS. 3A and 3B. Incidentally, the electric power supplied from the ground-side electrical circuit 2A to the power transmitting coil 1A is supposed to be constant. As illustrated in FIG. 4, an increase in the distance between the power transmitting coil 1A and the power receiving coil 1B in the direction of the Z axis with no changes in the positions of the power transmitting coil 1A and the power receiving coil 1B leads to a wide gap between the power transmitting coil 1A and the power receiving coil 1B and hence to a decrease in the electric power received by the power receiving coil 1B.

The power receiving coil 1B is fixed to the vehicle, and the distance between the power receiving coil 1B and the power transmitting coil 1A in the Z-direction is fixed at a distance ($Z_1$) in the Z-direction without significant change with respect to the parked position of the vehicle. With the distance in the Z-direction fixed at $Z_1$, a dashed line in FIG. 4 indicates maximum power received by the power receiving coil 1B. When the power transmitting coil 1A and the power receiving coil 1B are in their positions facing each other squarely with no position displacement between the point of center of the power transmitting coil 1A and the point of center of the power receiving coil 1B in the two-dimensional directions (which corresponds to FIG. 3A), the maximum power received by the power receiving coil 1B is 3.0 kW (indicated at a point A in FIG. 4). When a distance between the power transmitting coil 1A and the power receiving coil 1B in the X-direction becomes $X_1$ by displacement of the point of center of the power receiving coil 1B from the point of center of the power transmitting coil 1A in the X-direction (or the Y-direction) (which corresponds to FIG. 3B), the maximum power received by the power receiving coil 1B decreases to 1.5 kW (indicated at a point B in FIG. 4). When the distance between the power transmitting coil 1A and the power receiving coil 1B in the X-direction becomes $X_2$ by further displacement of the point of center of the power receiving coil 1B from the point of center of the power transmitting coil 1A in the X-direction (or the Y-direction), the electric power received by the power receiving coil 1B further decreases to 1.0 kW (indicated at a point C in FIG. 4).

Next, description will be given with reference to FIG. 5 with regard to the electric power received by the power receiving coil 1B and charging time for the battery 5. FIGS. 5A and 5B are graphs illustrating characteristics of the charging power for the battery 5 with respect to the charging time, and FIG. 5A illustrates characteristics in the case of charging under a condition where the electric power received by the power receiving coil 1B is 3.0 kW, and FIG. 5B illustrates characteristics in the case of charging under a condition where the electric power received by the power receiving coil 1B is 1.5 kW. The charging is started from a condition where the SOC of the battery 5 is 10%, and the charging is brought to an end at the time when the SOC of the battery 5 reaches 100%. The charging characteristics illustrated in FIG. 5A indicate the characteristics in the case where, in the relative positions of the coils illustrated in FIG. 3A, the charging takes place at the electric power indicated at the point A in FIG. 4, and the charging characteristics illustrated in FIG. 5B indicate the characteristics in the case where, in the relative positions of the coils illustrated in FIG. 3B, the charging takes place at the electric power indicated at the point B in FIG. 4.

Also, the charge control unit 704 charges the battery 5 by setting the charging power for the battery 5 at 3.0 kW before the SOC of the battery 5 reaches 80%, then reducing the charging power for the battery 5 to 2.5 kW when the SOC of the battery 5 reaches 80%, then reducing the charging power for the battery 5 to 1.5 kW when the SOC of the battery 5 reaches 90%, then reducing the charging power for the battery 5 to 1.2 kW when the SOC of the battery 5 reaches 94%, then reducing the charging power for the battery 5 to 1.0 kW when the SOC of the battery 5 reaches 96%, and then reducing the charging power for the battery 5 to 0.8 kW when the SOC of the battery 5 reaches 98%.

As illustrated in FIG. 5A, when charging is started from a condition where the SOC is 10% under a condition where the maximum power received by the power receiving coil 1B is 3.0 kW, the charge control unit 704 sets the maximum power (3.0 kW) received by the power receiving coil 1B as the charging power and supplies the charging power to the battery 5 to charge the battery 5, and reduces the charging power in a stepwise fashion according to the SOC under the above-described charging control. As for the charging time, the time required for the SOC to increase from 10% to 80% is 6 hours, the time required for the SOC to increase from 80% to 90% is 0.5 hours, the time required for the SOC to increase from 90% to 94% is 0.5 hours, the time required for the SOC to increase from 94% to 96% is 0.5 hours, the time required for the SOC to increase from 96% to 98% is 0.5 hours, and the time required for the SOC to increase from 98% to 100% is 0.5 hours. Then, the charging time required for charging to full charge, starting from the condition where the SOC of the battery 5 is 10%, is 8.5 hours (=6+0.5+0.5+0.5+0.5+0.5).

Figure 5B:
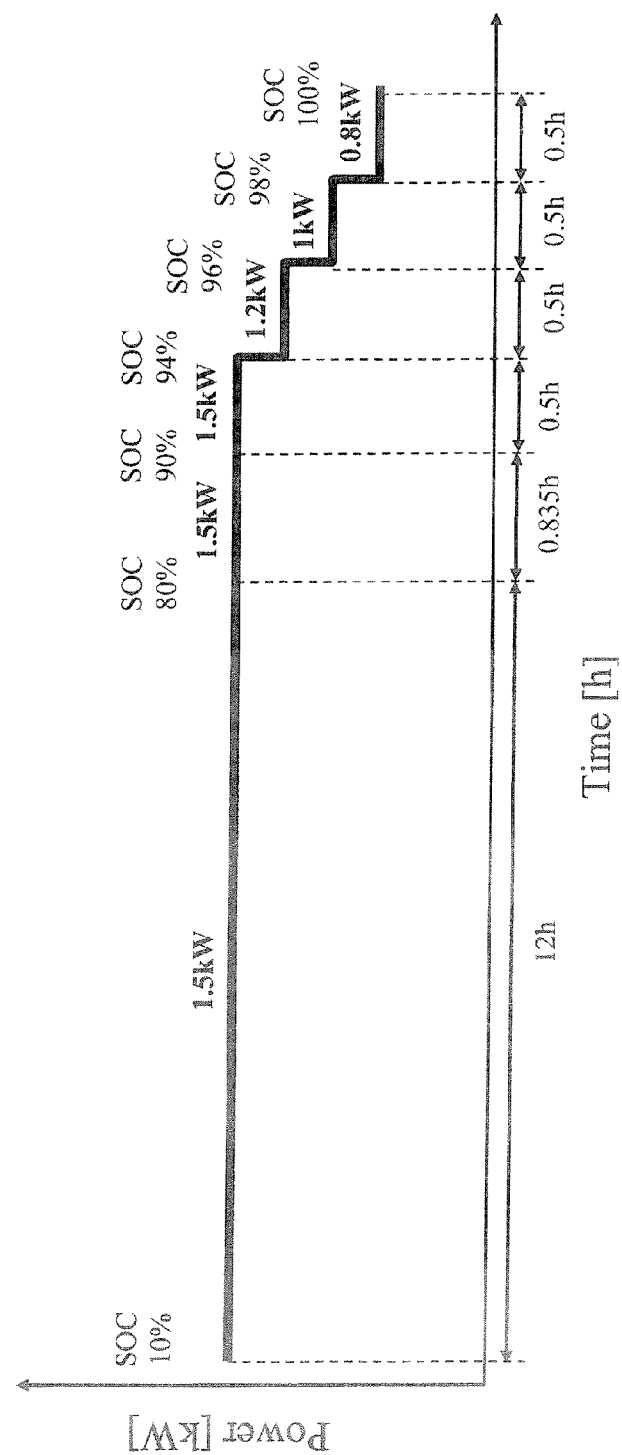
FIG. 5B is a graph illustrating characteristics of the charging power for the battery 5 with respect to the charging time in FIG. 1, illustrating characteristics in the case of charging under a condition where the electric power received by the power receiving coil is 1.5 kW.

Meanwhile, as illustrated in FIG. 5B, when charging, is started from a condition where the SOC is 10% under a condition where the maximum power received by the power receiving coil 1B is 1.5 kW, the charge control unit 704 sets the maximum power (1.5 kW) received by the power receiving coil 1B as the charging power and supplies the charging power to the battery 5 to charge the battery 5. As described above, the battery 5 of the first embodiment can be charged by 1.5 kW or more of power until the SOC reaches 94%. In the positions of the coils illustrated in FIG. 3B, however, the maximum power received by the power receiving coil 1B is 1.5 kW, and therefore, the charging power is set at 1.5 kW for charging until the SOC of the battery 5 reaches 94%, and the charging power is reduced in a stepwise fashion in the same manner as above described, after the time when the SOC of the battery 5 has reached 94%.

As for the charging time, the time required for the SOC to increase from 10% to 80% is 12 hours, the time required for the SOC to increase from 80% to 90% is 0.835 hours, the time required for the SOC to increase from 90% to 94% is 0.5 hours, the time required for the SOC to increase from 94% to 96% is 0.5 hours, the time required for the SOC to increase from 96% to 98% is 0.5 hours, and the time required for the SOC to increase from 98% to 100% is 0.5 hours. Then, the charging time required for charging to full charge, starting from the condition where the SOC of the battery 5 is 10%, is 14.835 hours (=12+0.835+0.5+0.5+0.5+0.5).

In other words, in the positions of the coils illustrated in FIG. 3B, the maximum power received by the power receiving coil 1B is smaller and hence the charging time for charging to full charge, starting from the condition where the SOC is 10%, is longer, as compared to the positions of the coils illustrated in FIG. 3A.

Next, description will be given with reference to FIG. 6 with regard to the electric power received by the power receiving coil 1B and the charging time for the battery 5. FIG. 6 is different from FIG. 5 in that charging is started at the time when the SOC is 90%. FIGS. 6A and 6B are graphs illustrating characteristics of the charging power for the battery 5 with respect to the charging time, and FIG. 6A illustrates characteristics in the case of charging under a condition where the electric power received by the power receiving coil 1B is 3.0 kW, and FIG. 6B illustrates characteristics in the case of charging under a condition where the electric power received by the power receiving coil 1B is 1.5 kW. The charging characteristics illustrated in FIG. 6A indicate the characteristics in the case where, in the relative positions of the coils illustrated in FIG. 3A, the charging takes place at the electric power indicated at the point A in FIG. 4, and the charging characteristics illustrated in FIG. 6B indicate the characteristics in the case where, in the relative positions of the coils illustrated in FIG. 3B, the charging takes place at the electric power indicated at the point B in FIG. 4.

In an example illustrated in FIG. 6, the charging is performed starting from a condition where the SOC of the battery 5 is 90%, and therefore, the charge control unit 704 charges the battery 5 by setting the charging power for the battery 5 at 1.5 kW before the SOC of the battery 5 reaches 94%, then reducing the charging power for the battery 5 to 1.2 kW when the SOC of the battery 5 reaches 94%, then reducing the charging power for the battery 5 to 1.0 kW when the SOC of the battery 5 reaches 96%, and then reducing the charging power for the battery 5 to 0.8 kW when the SOC of the battery 5 reaches 98%.

As illustrated in FIG. 6A, when charging is started from a condition where the SOC is 90% under a condition where the maximum power received by the power receiving coil 1B is 3.0 kW, the charge control unit 704 limits the maximum power (3.0 kW) received by the power receiving coil 1B to the charging power (1.5 kW) and supplies the charging power to the battery 5 to charge the battery 5, and reduces the charging power in a stepwise fashion according to the SOC under the above-described charging control. As for the charging time, the time required for the SOC to increase from 90% to 94% is 0.5 hours, the time required for the SOC to increase from 94% to 96% is 0.5 hours, the time required for the SOC to increase from 96% to 98% is 0.5 hours, and the time required for the SOC to increase from 98% to 100% is 0.5 hours. Then, the charging time required for charging to full charge, starting from the condition where the SOC of the battery 5 is 90%, is 2.0 hours (=0.5+0.5+0.5+0.5).

Meanwhile, as illustrated in FIG. 6B, when charging is started from a condition where the SOC is 90% under a condition where the maximum power received by the power receiving coil 1B is 1.5 kW, the charge control unit 704 sets the maximum power (1.5 kW) received by the power receiving coil 1B as the charging power and supplies the charging power to the battery 5 to charge the battery 5, and reduces the charging power in a stepwise fashion according to the SOC under the above-described charging control. As for the charging time, the time required for the SOC to increase from 90% to 94% is 0.5 hours, the time required for the SOC to increase from 94% to 96% is 0.5 hours, the time required for the SOC to increase from 96% to 98% is 0.5 hours, and the time required for the SOC to increase from 98% to 100% is 0.5 hours. Then, the charging time required for charging to full charge, starting from the condition where the SOC of the battery 5 is 90%, is 2.0 hours (=0.5+0.5+0.5+0.5).

In the positions of the coils illustrated in FIG. 3B, the maximum power received by the power receiving coil 1B is smaller as compared to that in the positions of the coils illustrated in FIG. 3A. However, the maximum power received by the power receiving coil 1B is equal to or more than maximum charging power at the time of start of the charging of the battery 5, and thus, the charging time does not vary even with occurrence of position displacement between the coils as illustrated in FIG. 3B.

In other words, when the SOC is close to full charge, electric power required for charging may be small as illustrated in FIGS. 5 and 6, and thus, the position displacement between the coils is more tolerable as the SOC is closer to full charge.

Figure 7:
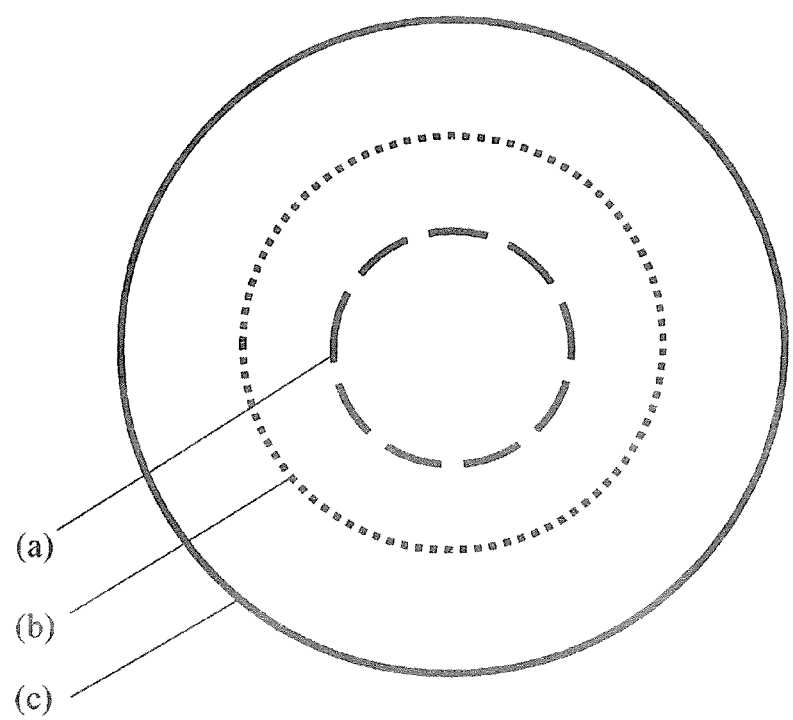
FIG. 7 is a view of assistance in explaining a permissible charging range set by a permissible charging range setting unit illustrated in FIG. 2.

Next, details of control in the non-contact charging system of the first embodiment will be described with reference to FIGS. 2 and 7. FIG. 7 is a schematic view of assistance in explaining a permissible charging range, and corresponds to a plan view of the power receiving coil 1B.

The non-contact charging system of the first embodiment operates at the time of parking of the vehicle in the parking space provided with the ground-side unit 100. First, the state-of-charge detection unit 601 detects the SOC of the battery 5 and transmits information on the detected SOC to the ECU 7. Then, the permissible charging range setting unit 701 sets a permissible charging range according to the SOC of the battery 5 in the following manner. The permissible charging range setting unit 701 sets the permissible charging range along a direction of a principal surface of the power transmitting coil 1A or the power receiving coil 1B. The permissible charging range is a virtual circular range centering around the power receiving coil 1B, and is a range for determining that charging is permitted when the power transmitting coil 1A lies within the permissible charging range. Also, the permissible charging range is set so that the charging is finished within a preassumed charging time. As illustrated in FIG. 5B, even when there is a large amount of position displacement between the power transmitting coil 1A and the power receiving coil 1B, the charging of the battery 5 is possible, provided that the power receiving coil 1B is in a position capable of receiving electric power. However, charging to full charge, starting from a condition where the SOC of the battery 5 is small, requires a long charging time. Therefore, the permissible charging range is set according to the SOC of the battery 5 so that a permitted position displacement between the coils is a range in a horizontal direction (or in a direction parallel to the parking space), in order that the charging is finished within the preassumed charging time.

Specifically, as illustrated in FIG. 7, the permissible charging range setting unit 701 sets an area (a) as the permissible charging range when the SOC of the battery 5 lies between 0% inclusive and 80% exclusive, sets an area (b) as the permissible charging range when the SOC of the battery 5 lies between 80% inclusive and 90% exclusive, or sets an area (c) as the permissible charging range when the SOC of the battery 5 is equal to or more than 90%. In other words, the permissible charging range setting unit 701 sets the permissible charging range wider as the SOC is larger, and thereby, the permitted amount of position displacement between the coils is larger as the SOC is higher.

When the permissible charging range is set by the permissible charging range setting unit 701, the ECU 7 utilizes a parking assist system using the navigation system and a vehicle-mounted camera (unillustrated), thereby to display the permissible charging range on a display of the navigation system. The vehicle driver can park the vehicle in a position suitable for charging, by viewing the display to adjust a parking position so that the position of the power transmitting coil 1A lies within the permissible charging range.

Then, after the vehicle has been parked, the ECU 7 detects the position of the power transmitting coil 1A through the communication devices 8A, 8B. Incidentally, in the first embodiment, the position of the power transmitting coil 1A is detected by communication between the ground-side communication device 8A and the vehicle-side communication device 8B; however, for example, the power transmitting coil 1A or the power receiving coil 1B may be provided with a position sensor for detection. Alternatively, the ground-side unit 100 may be provided with an antenna for signal transmission and the vehicle-side unit 200 may be provided with a receiver so that the position of the coil is detected based on the status of communication of a signal transmitted from the antenna.

When the position of the power transmitting coil 1A is detected through the communication devices 8A, 8B, the determination unit 702 determines whether or not the position of the power transmitting coil lies within the permissible charging range. Then, when the position of the power transmitting coil lies within the permissible charging range, the determination unit 702 determines that the charging of the battery 5 is possible. When the determination unit 702 determines that the charging is permitted, the charge control unit 704 controls the electric power received by the power receiving coil 1B to the charging power suitable for the charging of the battery 5 according to the SOC detected by the state-of-charge detection unit 601, and supplies the charging power to the battery 5. In other words, when the electric power received by the power receiving coil 1B is larger than the charging power suitable for the charging, the charge control unit 704 limits the received power to the charging power suitable for the charging and supplies the suitable charging power to the battery 5. Meanwhile, when the electric power received by the power receiving coil 1B is smaller than the charging power suitable for the charging, the charge control unit 704 sets the electric power received by the power receiving coil 1B as the charging power and supplies the charging power to the battery 5. When the determination unit 702 determines that the charging is not permitted, the determination result notification unit 703 notifies the driver of determined results and may also provide notification to the driver to urge him or her to park the vehicle over again.

The state-of-charge detection unit 601 detects the SOC also during the charging of the battery 5, and the charge control unit 704 reduces the charging power in a stepwise fashion as the SOC becomes higher. Then, at the time when the battery 5 reaches full charge, the charge control unit 704 terminates the supply of electric power to the battery 5. Thereby, the battery 5 is charged in the non-contact charging system of the first embodiment.

Figure 8:
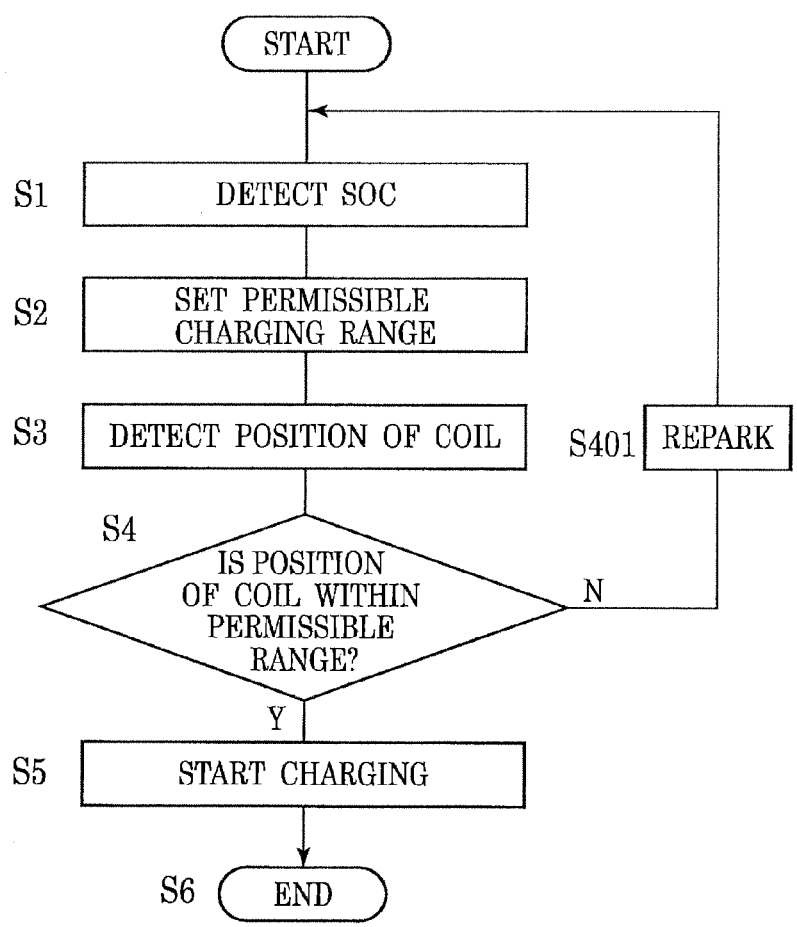
FIG. 8 is a flowchart illustrating a control procedure of the non-contact charging system illustrated in FIG. 1.

Next, a control procedure of the non-contact charging system of the first embodiment will be described with reference to FIG. 8. FIG. 8 is a flowchart illustrating the control procedure of the non-contact charging system of the first embodiment. When control by the non-contact charging system of the first embodiment is started, at step S1, the state-of-charge detection unit 601 detects the SOC of the battery 5 and transmits information on the detected SOC to the ECU 7. At step S2, the permissible charging range setting unit 701 sets a permissible charging range according to the detected SOC. At step S3, the ECU 7 detects the position of the power transmitting coil 1A through the ground-side communication device 8A and the vehicle-side communication device 8B. Incidentally, in the non-contact charging system of the first embodiment, for example when the vehicle is approaching the parking space or when the parking of the vehicle in the parking space is started, the ground-side communication device 8A may start communicating with the vehicle-side communication device 8B to detect the position of the power transmitting coil 1A.

At step S4, the determination unit 702 determines whether or not the position of the power transmitting coil 1A lies within the permissible charging range. When the position of the power transmitting coil 1A does not lie within the permissible charging range, the determination unit 702 determines not to permit charging, and at step S401, the determination result notification unit 703 provides a display to a vehicle occupant to urge him or her to park the vehicle over again, thereby to notify the vehicle occupant of determined results indicating that the charging is not permitted, and the control returns to step S1. When the position of the power transmitting coil 1A lies within the permissible charging range, the determination unit 702 determines to permit the charging, and the control moves on to step S5.

At step S5, the charge control unit 704 sets charging power according to the SOC of the battery 5 and electric power received by the power receiving coil 1B and supplies the charging power to the battery 5 thereby to start the charging of the battery 5. Also, the determination result notification unit 703 notifies the vehicle occupant of the start of the charging thereby to notify the vehicle occupant of determined results indicating that the charging is permitted. Then, the SOC of the battery 5 reaches a state of full charge, and the control by the non-contact charging system of the first embodiment comes to an end.

As described above, the non-contact charging device of the first embodiment includes the power receiving coil 1B, the vehicle-side electrical circuit 2B, the battery 5, the state-of-charge detection unit 601, and the permissible charging range setting unit 701, and the permissible charging range indicating the range of the position of the power transmitting coil 1A relative to the position of the power receiving coil 1B in which the charging of the battery 5 is permitted, is set according to the SOC. Position displacement between the power receiving coil 1B and the power transmitting coil 1A, which is permitted for the charging of the battery 5, varies according to the SOC of the battery 5. In the first embodiment, the permissible charging range is set according to the SOC and thus a range in which the position displacement is permitted can be determined; for example, if the position displacement between the coils falls outside the permissible charging range, the driver can park the vehicle in such a manner that the position displacement between the coils falls within the permissible charging range, and therefore, user's convenience can be improved. Also, in the first embodiment, for example when the permissible charging range is displayed on the display of the navigation system by utilizing the parking assist system using the navigation system, the driver can adjust the position of the power receiving coil 1B relative to the position of the power transmitting coil 1A within the range in which the charging of the battery 5 is permitted, by parking the vehicle while viewing the permissible charging range. As a result, the non-contact charging device of the first embodiment can improve the user's convenience.

Also, in the first embodiment, the permissible charging range setting unit 701 sets the permissible charging range wider as the SOC is higher. The optimum charging power for the charging of the battery 5 with high SOC is smaller than the charging power for the battery 5 with low SOC. Therefore, when the SOC is high, the electric power received by the power receiving coil 1B may be small, and thus, the range in which the position displacement between the coils is permitted is wide. In the first embodiment, the permissible charging range is set wider as the SOC is higher, and thus, the range of position displacement between the coils, which is peimitted for the charging, can be set according to the SOC, and as a result, the user's convenience can be improved.

Also, in the first embodiment, the non-contact charging device includes the communication devices 8A, 8B for detection of the position of the power transmitting coil, the determination unit 702, and the determination result notification unit 703 for providing notification of results determined by the determination unit 702, and the determination unit 702 determines that the charging of the battery 5 is permitted, when the position of the power transmitting coil lies within the permissible charging range. Thereby, the vehicle occupant can see the notification of the determined results provided to him or her by the determination result notification unit 703, thereby to check whether or not the charging is possible in the present parked position of the vehicle. Also, when the vehicle is parked in a position unsuitable for the charging in which there is a large amount of position displacement between the coils, the notification from the determination result notification unit 703 enables the vehicle occupant to see the unsuitable position, and as a result, the first embodiment can improve the user's convenience. Also, when the vehicle is parked in the position unsuitable for the charging in which there is a large amount of position displacement between the coils, the electric power received by the power receiving coil 1B is small, and therefore, the battery 5 cannot be fully charged, or the charging time for fully charging the battery 5 is long. In the first embodiment, when the vehicle is in the position unsuitable for the charging in which there is a large amount of position displacement between the coils, the notification from the determination result notification unit 703 enables the vehicle occupant to see the position unsuitable for the charging, and thus, the vehicle occupant can park the vehicle over again in such a manner that the vehicle is in a position suitable for the charging, and as a result, a reduction in the charging time can be achieved.

Incidentally, in the first embodiment, the permissible charging range is in circular form; however, the permissible charging range is not necessarily required to be in circular form but may be rectangular in shape. Also, in the first embodiment, the permissible charging range is a plane in two dimensions; however, a three-dimensional region may be used as the permissible charging range.

Also, in the first embodiment, the permissible charging range is set wider as the SOC is higher, and therefore, as illustrated in FIG. 7, plural permissible charging ranges are set by using the SOC (80%) and the SOC (90%) as boundaries between the ranges; however, it is not necessarily required that the SOC (80%) and the SOC (90%) be used as the boundaries, and the permissible charging range may be continuously varied according to the SOC.

Also, in the first embodiment, a control portion of a vehicle-side system is divided into the BC 6 and the ECU 7; however, the BC 6 and the ECU 7 may be configured as one controller.

Also, although the permissible charging range is preset so that the charging is finished within the preassumed charging time, the extent of the permissible charging range may be set according to charging time desired by the vehicle occupant. For example when the driver parks the vehicle and has plenty of time before next driving, the charging time can be set long. Also, when the charging time can be set long, the electric power received by the power receiving coil 1B can be set small as illustrated in FIGS. 5 and 6, and thus, the permissible charging range can be set wide. In other words, the vehicle occupant sets a desired charging time, and the permissible charging range setting unit 701 sets the permissible charging range wide when the charging time is long, or sets the permissible charging range narrow when the charging time is short. Thereby, in the first embodiment, the range in which the position displacement between the coils is permitted can be set according to the charging time desired by the vehicle occupant and the SOC, and thus, the user's convenience can be improved.

Incidentally, in the first embodiment, the vehicle-side electrical circuit 2B may have a temperature detection circuit such as a thermistor to detect the temperature of the battery 5, and the permissible charging range setting unit 701 may set the permissible charging range according to the detected temperature of the battery 5. Also, the vehicle-side electrical circuit 2B may have a temperature detection circuit such as a thermistor to detect a temperature in the vehicle, and the permissible charging range setting unit 701 may set the permissible charging range according to the detected temperature in the vehicle. Thereby, whether or not the charging is permitted can be properly determined according to the temperature of the battery 5 or the temperature in the vehicle, and thus, the user's convenience can be improved.

The power receiving coil 1B and the vehicle-side electrical circuit 2B correspond to a "power receiving device" of the present invention; the state-of-charge detection unit 601, a "state-of-charge detection means"; the permissible charging range setting unit 701, a "permissible charging range setting means"; the determination unit 702, a "determination means"; the determination result notification unit 703, a "determination result notification means"; the ground-side communication device 8A and the vehicle-side communication device 8B, a "position detection means"; the charge control unit 704, a "charge control means"; and the temperature detection circuit included in the vehicle-side electrical circuit 2B, a "temperature detection means."

[Second Embodiment]

Figure 9:
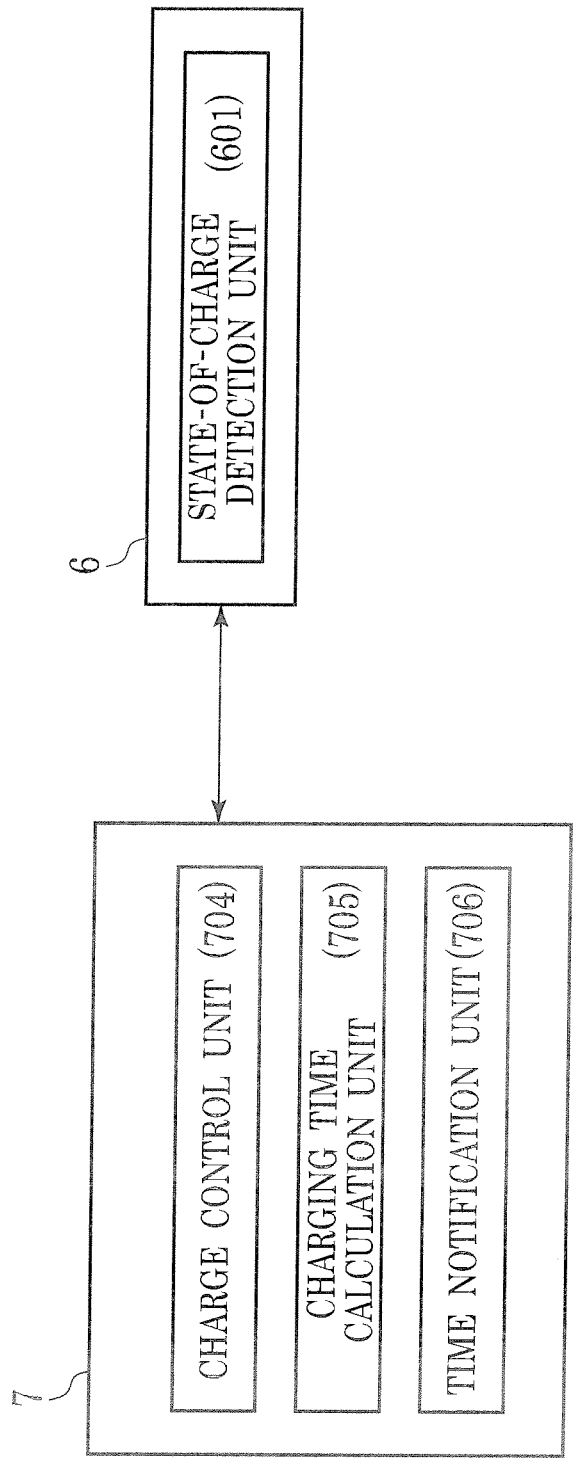
FIG. 9 is a block diagram of a battery controller and an electronic control unit of a non-contact charging system according to another embodiment of the present invention.

FIG. 9 is a block diagram illustrating a non-contact charging system according to another embodiment of the invention. The second embodiment is different from the above-mentioned first embodiment in including a charging time calculation unit 705 and a time notification unit 706. Since the remaining configuration is the same as that of the above-mentioned first embodiment, description thereof will be incorporated as appropriate.

As illustrated in FIG. 9, the ECU 7 includes the charge control unit 704, the charging time calculation unit 705, and the time notification unit 706. The charging time calculation unit 705 calculates charging time ($T_1$) for charging the battery 5 according to the SOC detected by the state-of-charge detection unit 601 and the position of the power transmitting coil relative to the position of the power receiving coil 1B. As illustrated in FIG. 4, the electric power received by the power receiving coil 1B varies according to the amount of displacement of the position of the power receiving coil 1B relative to the position of the power transmitting coil 1A. Therefore, the electric power received by the power receiving coil 1B can be seen by detecting the amount of displacement of the position of the power receiving coil 1B relative to the position of the power transmitting coil 1A. Then, as illustrated in FIGS. 5 and 6, the charging time for the battery 5 can be calculated by obtaining the electric power received by the power receiving coil 1B and the present SOC of the battery 5.

In the second embodiment, first, when the vehicle is parked in a predetermined parking space, the ECU 7 detects the position of the power transmitting coil 1A through the ground-side communication device 8A and the vehicle-side communication device 8B. Also, the state-of-charge detection unit 601 detects the SOC of the battery 5. The charging time calculation unit 705 calculates the amount of position displacement between the coils from the position of the power transmitting coil 1A relative to the position of the power receiving coil 1B. Then, the charging time calculation unit 705 calculates the electric power received by the power receiving coil 1B from the amount of position displacement between the coils. Incidentally, as for the electric power received by the power receiving coil 1B, the ECU 7 stores a map such as is illustrated in FIG. 4, and refers to the map for the detected position of the power transmitting coil 1A thereby to calculate the electric power received by the power receiving coil 1B.

When output power from the power transmitting coil 1A to the power receiving coil 1B is fixed in the ground-side unit 100, the charging time calculation unit 705 can calculate the electric power received by the power receiving coil 1B, by calculating what percentage of the prefixed output power can be received by the power receiving coil 1B, according to the amount of position displacement between the coils. Meanwhile, when the output power from the power transmitting coil 1A to the power receiving coil 1B is variable in the ground-side unit 100, the ECU 7 detects the output power from the power transmitting coil 1A set by the ECU 3 through the communication devices 8A, 8B. Then, the charging time calculation unit 705 can calculate the electric power received by the power receiving coil 1B, by calculating what percentage of the detected output power can be received by the power receiving coil 1B, according to the amount of position displacement between the coils.

Then, the charge control unit 704 sets charging power for the battery 5, based on charging power requested by the BC 6 and the electric power received by the power receiving coil 1B. The charging time calculation unit 705 calculates the charging time ($T_1$) for charging to full charge, starting from the SOC, from the charging power set by the charge control unit 704 and the SOC, based on the mode of charging of the charge control unit 704. Incidentally, for example when the target SOC after charging is set by user demand or the like, the charge control unit 704 calculates the charging time ($T_1$) taken to increase from the present SOC to the target SOC.

Thereby, the charging time calculation unit 705 calculates the charging time ($T_1$) from the detected position of the power transmitting coil 1A and the detected SOC. The calculated charging time ($T_1$) is longer as the amount of displacement of the position of the power transmitting coil 1A relative to the position of the power receiving coil 113 is larger, and the charging time ($T_1$) is longer as the SOC is smaller.

Also, the charging time calculation unit 705 calculates charging time ($T_2$) in a case where the power receiving coil 1B is located in a position corresponding to the position of the power transmitting coil 1A, from the SOC. The position of the power receiving coil 1B corresponding to the position of the power transmitting coil 1A refers to a position in which the center of the power transmitting coil 1A coincides with the center of the power receiving coil 1B in the two-dimensional directions of the power transmitting coil 1A or the power receiving coil 1B, and, in this position, the power reception efficiency of the power transmitting coil 1A and the power receiving coil 1B is highest, and this position corresponds to the ideal parked position of the vehicle. Also, the ideal parked position of the vehicle is a position in which the power transmitting coil 1A and the power receiving coil 1B face each other squarely, and, in this position, the charging time is the shortest. Under a condition where the SOC has the same value, therefore, the charging time ($T_1$) at the occurrence of position displacement between the coils is longer than the charging time ($T_2$).

When the power receiving coil 1B is located in the position corresponding to the position of the power transmitting coil 1A (or in the ideal parked position of the vehicle), a power loss involved in power transmission from the power transmitting coil 1A to the power receiving coil 1B is predetermined. Therefore, when the output power from the power transmitting coil 1A to the power receiving coil 1B is fixed, the electric power received by the power receiving coil 1B, in the ideal parked position of the vehicle, is predetermined, and thus, the charging time calculation unit 705 can calculate the charging time ($T_2$) by using the present SOC without using position information on the power transmitting coil 1A.

Also, when the output power from the power transmitting coil 1A to the power receiving coil 1B is variable in the ground-side unit 100, the ECU 7 detects the output power from the power transmitting coil 1A set by the ECU 3 through the communication devices 8A, 8B. The ECU 7 calculates the electric power received by the power receiving coil 1B, by subtracting the power loss involved in the power transmission in the ideal parked position of the vehicle from the output power. The charge control unit 704 sets the charging power for the battery 5, based on the charging power requested by the BC 6 and the electric power received by the power receiving coil 1B. Then, the charging time calculation unit 705 can calculate the charging time ($T_2$) by using the charging power and the present SOC.

When the charging time ($T_1$) and the charging time ($T_2$) are calculated by the charging time calculation unit 705, the ECU 7 calculates a time difference ($\Delta T$) between the charging time ($T_1$) and the charging time ($T_2$) and compares the time difference ($\Delta T$) with a preset time difference ($\Delta Tc$). The time difference ($\Delta Tc$) indicates a time difference from charging time allowed for the charging time ($T_2$). In other words, at the occurrence of displacement of the positions of the coils relative to the positions of the coils corresponding to the charging time ($T_2$), the charging time ($T_1$) is longer than the charging time ($T_2$), and the charging time ($T_1$) is longer as the amount of position displacement between the coils is larger. Therefore, the time difference ($\Delta Tc$) is equivalent to the permitted amount of position displacement between the coils. Incidentally, the time difference ($\Delta Tc$) may be set so as to correspond to the preassumed charging time, or may be set according to the charging time desired by the vehicle occupant, and the time difference ($\Delta Tc$) is larger as the charging time desired by the vehicle occupant is longer.

Then, when the time difference ($\Delta T$) is larger than the time difference ($\Delta Tc$), the ECU 7 determines that position displacement between the coils occurs to such an extent that charging within the allowed charging time is impossible, and the time notification unit 706 notifies the vehicle occupant of the charging time ($T_1$). When the vehicle occupant checks the charging time ($T_1$) and determines that charging which takes the charging time ($T_1$) can be performed for the charging of the battery 5, the vehicle occupant operates a charge start button (unillustrated) or the like to start the charging. Meanwhile, when the vehicle occupant determines that the charging which takes the charging time ($T_1$) is not performed for the charging of the battery 5, the driver parks the vehicle over again so as to achieve a smaller amount of position displacement between the coils.

When the time difference ($\Delta T$) is smaller than the time difference ($\Delta Tc$), the ECU 7 determines that the amount of position displacement between the coils is such that the charging within the allowed charging time is possible, and the ECU 7 controls the charge control unit 704 to start the charging of the battery 5.

Thereby, in the second embodiment, the charging time ($T_1$) is calculated according to the position of the power transmitting coil 1A and the SOC, notification of the charging time ($T_1$) is provided according to a result of comparison between the charging time ($T_1$) and the charging time ($T_2$), and the battery 5 is charged.

Figure 10:
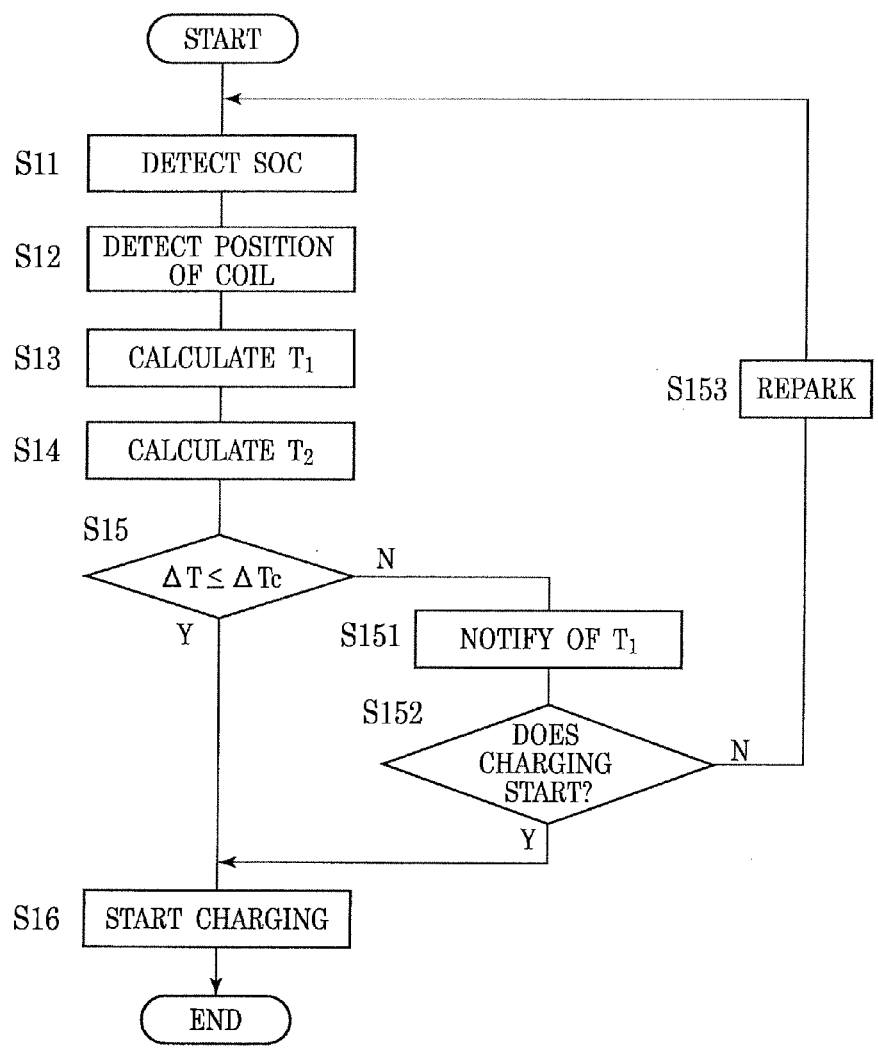
FIG. 10 is a flowchart illustrating a control procedure of the non-contact charging system illustrated in FIG. 9.

Next, a control procedure of the non-contact charging system of the second embodiment will be described with reference to FIG. 10. FIG. 10 is a flowchart illustrating the control procedure of the non-contact charging system of the second embodiment. When control by the non-contact charging system of the second embodiment is started, at step S11, the state-of-charge detection unit 601 detects the SOC of the battery 5 and transmits information on the detected SOC to the ECU 7. At step S12, the ECU 7 detects the position of the power transmitting coil 1A through the ground-side communication device 8A and the vehicle-side communication device 8B. At step S13, the charging time calculation unit 705 calculates the charging time ($T_1$) according to the detected position of the power transmitting coil 1A and the detected SOC. At step S14, the charging time calculation unit 705 calculates the charging time ($T_2$) according to the SOC.

At step S15, the ECU 7 calculates the time difference ($\Delta T$) between the charging time ($T_1$) and the charging time ($T_2$) and compares the time difference ($\Delta T$) with the preset time difference ($\Delta Tc$). When the time difference ($\Delta T$) is equal to or less than the time difference ($\Delta Tc$), the ECU 7 determines that the charging within the preset allowed time is possible, and the charge control unit 704 sets charging power according to the SOC of the battery 5 and electric power received by the power receiving coil 1B and supplies the charging power to the battery 5 thereby to start the charging of the battery 5 (at step S16).

Meanwhile, when the time difference ($\Delta T$) is larger than the time difference ($\Delta Tc$), the ECU 7 determines that the charging within the preset allowed time is impossible, and the time notification unit 706 notifies the vehicle occupant of the charging time ($T_1$) by displaying the charging time ($T_1$) on the display or the like of the navigation system (at step S151). At step S152, the vehicle occupant determines whether or not to perform the charging which takes the charging time ($T_1$). When the vehicle occupant determines that the charging of the battery 5 can take the charging time ($T_1$) and the vehicle occupant operates the charge start button (unillustrated) or the like to start the charging, the control moves on to step S16. When the vehicle occupant determines not to perform the charging which takes the charging time ($T_1$), the driver parks the vehicle over again at step S153, and the control returns to step S11. For example in a case where the time difference ($\Delta Tc$) is set to 1 hour and the charging time ($T_1$) is 9 hours and the charging time ($T_2$) is 7 hours, when the vehicle occupant thinks that charging within 10 hours is good enough, it is not necessary to park the vehicle over again in its ideal parked position, and thus, in the second embodiment, the charging which takes the charging time ($T_1$) is started. Meanwhile, when the vehicle occupant desires charging within 8 hours, the charging cannot be finished within his or her desired time in the relative positions of the coils in which the charging time ($T_1$) is taken, and therefore, the vehicle is parked over again.

Then, the SOC of the battery 5 reaches a state of full charge, and the control by the non-contact charging system of the second embodiment comes to an end.

As described above, the non-contact charging device of the second embodiment includes the power receiving coil 113, the vehicle-side electrical circuit 2B, the battery 5, the state-of-charge detection unit 601, the communication devices 8A, 8B, and the charging time calculation unit 705, and the charging time ($T_1$) for the battery 5 is calculated according to the detected position of the power transmitting coil 1A and the SOC. The charging time ($T_1$) for the battery 5 varies according to the position displacement between the power receiving coil 113 and the power transmitting coil 1A and the SOC. In the second embodiment, the charging time ($T_1$) can be calculated according to the position of the power transmitting coil 1A and the SOC, and thus, for example when the vehicle occupant is notified of the charging time ($T_1$), the vehicle occupant can see the charging time ($T_1$) according to the position displacement between the coils. Also, when the notified charging time ($T_1$) is long, the vehicle occupant can recognize that the amount of position displacement between the coils is large, and thus, the vehicle occupant parks the vehicle over again to reduce the amount of position displacement between the coils, and thereby, a reduction in the charging time can be achieved. Also, when the vehicle occupant can afford the time to charge, the vehicle occupant can charge the battery 5 even if the amount of position displacement between the coils is large and hence the charging time ($T_1$) is long, and thus, the driver can save time and labor for parking the vehicle over again to adjust the positions of the coils, and as a result, the second embodiment can improve the user's convenience.

Also, for example when an allowed charging time ($T_s$) is set, the permitted amount of position displacement between the coils can be determined by the charging time, and thus, comparison of the charging time ($T_1$) with the charging time ($T_s$) enables seeing whether or not the charging can be finished within the charging time ($T_s$) in the present parked position of the vehicle. Specifically, the charging is permitted when the charging time ($T_1$) is smaller than the charging time ($T_s$), while on the other hand, the charging is not permitted when the charging time ($T_1$) is larger than the charging time ($T_s$). Then, the driver can park the vehicle so as to keep the relative positions of the coils permitted according to the SOC, in accordance with determined results, and thus, the second embodiment can improve the user's convenience. Also, when the charging time ($T_1$) due to position displacement between the coils falls outside the allowed charging time ($T_s$), the vehicle is parked over again to reduce the amount of position displacement between the coils, and thereby, a reduction in the total charging time can be achieved. Incidentally, the allowed charging time ($T_s$) may be the time set by the vehicle occupant.

Also, in the second embodiment, the charging time ($T_2$) for the battery 5 in the case where the power receiving coil 1B is located in the position corresponding to the position of the power transmitting coil 1A is calculated. In the second embodiment, the charging time ($T_1$) and the charging time ($T_2$) are calculated, and thereby, the amount of position displacement between the power transmitting coil 1A and the power receiving coil 1B with respect to the points of centers thereof can be determined by the charging time.

Also, in the second embodiment, when the time difference ($\Delta T$) between the charging time ($T_1$) and the charging time ($T_2$) is larger than the time difference ($\Delta Tc$), the time notification unit 706 provides notification of at least the charging time ($T_1$). Thereby, the user can be notified that the charging cannot be finished within the allowed time because of a large amount of position displacement between the coils. Also, when the user can afford the time, the user can perform the charging which takes the charging time ($T_1$), while on the other hand, when the user cannot afford the time, the user can perform the charging in a shorter time than the charging time ($T_1$), for example by parking the vehicle over again or doing the like to change the positions of the coils. As a result, the second embodiment enables achieving a reduction in the total charging time as well as an improvement in the user's convenience.

Incidentally, at step S151, when the time difference ($\Delta T$) is larger than the time difference ($\Delta Tc$), the time notification unit 706 provides notification of the charging time ($T_1$); however, the time notification unit 706 may provide notification of the charging time ($T_1$) in conjunction with the charging time ($T_2$), provided only that the time notification unit 706 provides notification of at least the charging time ($T_1$). The time notification unit 706 provides notification of the charging time ($T_1$) and the charging time ($T_2$), and thereby, the vehicle occupant can see the charging time ($T_1$) in the present parked position of the vehicle and the charging time ($T_2$) in the ideal parked position of the vehicle, and thus, the vehicle occupant can select the start of the charging in the present parked position of the vehicle or the reparking of the vehicle, as needed, and therefore, the second embodiment can improve the user's convenience.

The charging time calculation unit 705 corresponds to a "charging time calculation means," and the time notification unit 706 corresponds to a "charging time notification means."

[Third Embodiment]

Figure 11:
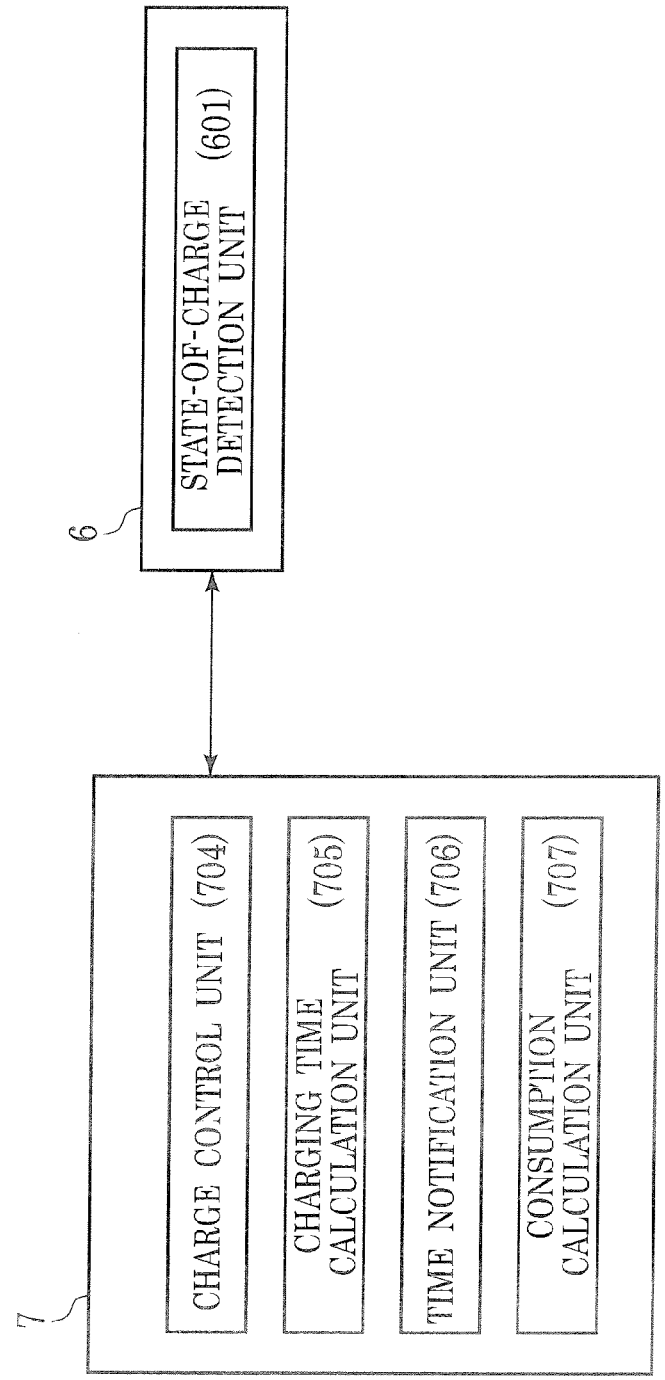
FIG. 11 is a block diagram of a battery controller and an electronic control unit of a non-contact charging system according to still another embodiment of the present invention.

FIG. 11 is a block diagram illustrating a non-contact charging system according to still another embodiment of the invention. The third embodiment is different from the above-mentioned second embodiment in including a consumption calculation unit 707. Since the remaining configuration is the same as that of the above-mentioned second embodiment, description thereof will be incorporated as appropriate.

As illustrated in FIG. 11, the ECU 7 includes the charge control unit 704, the charging time calculation unit 705, the time notification unit 706, and the consumption calculation unit 707. The consumption calculation unit 707 calculates the amount of the battery 5 consumed by moving the vehicle provided with the vehicle-side unit 200.

In the non-contact charging system according to the second embodiment, at step S153 of FIG. 10, the driver parks the vehicle over again to adjust the positions of the power transmitting coil 1A and the power receiving coil 1B. Parking the vehicle over again consumes electric power charged into the battery 5. Therefore, when the vehicle is parked over again and the battery 5 is charged in the ideal parked position of the vehicle, charging time is obtained by adding charging time for charging the capacity of the battery corresponding to the amount of the battery consumed by parking the vehicle over again, to the charging time ($T_2$).

In the third embodiment, the consumption calculation unit 707 calculates the amount of the battery 5 consumed by parking the vehicle over again to move the power receiving coil 1B to the position corresponding to the position of the power transmitting coil 1A. In other words, the consumption calculation unit 707 calculates to what extent the battery 5 consumes electric power by moving the vehicle from its present parked position to park the vehicle in its ideal parked position. Then, the charging time calculation unit 705 calculates charging time ($T_3$) for charging the amount of the battery consumed. In other words, the charging time calculation unit 705 converts the amount of the battery 5 consumed to the charging time. When the vehicle is parked and position displacement between the coils occurs, the charging time for fully charging the battery 5 is the charging time ($T_1$) calculated by the charging time calculation unit 705. Also, when the vehicle is parked over again in its ideal parked position by being moved from its parked position in which the position displacement between the coils occurs, charging time ($T_4$) for fully charging the battery 5 is calculated by the charging time calculation unit 705 adding the charging time ($T_3$) to the charging time ($T_2$).

Before the vehicle is parked over again, the charging time calculation unit 705 calculates the charging time ($T_4$). Specifically, a traveling path through which the vehicle is parked over again in its ideal parked position by being moved from its parked position in which the position displacement between the coils occurs is calculated by using an optimum route calculation system or the like used in the navigation system, obstacle avoidance control, or the like, and thus, before the vehicle is parked over again, the consumption calculation unit 707 can acquire the present SOC detected by the state-of-charge detection unit 601 and calculate the amount of the battery 5 consumed from the SOC and the traveling path.

Then, the ECU 7 compares the charging time ($T_1$) with the charging time ($T_4$). When the charging time ($T_1$) is longer than the charging time ($T_4$), a shorter charging time can be achieved by the driver parking the vehicle over again in its ideal parked position. Therefore, when the charging time ($T_1$) is longer than the charging time ($T_4$), the ECU 7 performs control so that the time notification unit 706 provides notification of the charging time ($T_1$) and the charging time ($T_4$) in order for the vehicle occupant to determine whether to start the charging or park the vehicle over again. Meanwhile, when the charging time ($T_1$) is shorter than the charging time ($T_4$), the charging time becomes longer if the driver parks the vehicle over again, and thus, a shorter charging time can be achieved by performing the charging in the present parked position of the vehicle. Therefore, when the charging time ($T_1$) is shorter than the charging time ($T_4$), the ECU 7 causes the charge control unit 704 to start the charging of the battery 5.

Thereby, in the third embodiment, the charging time ($T_1$) in the present parked position of the vehicle and the charging time ($T_4$) in the ideal position allowing for the amount of the battery 5 consumed by parking the vehicle over again are calculated, and the battery 5 is charged according to a result of comparison between the charging time ($T_1$) and the charging time ($T_4$).

Figure 12:
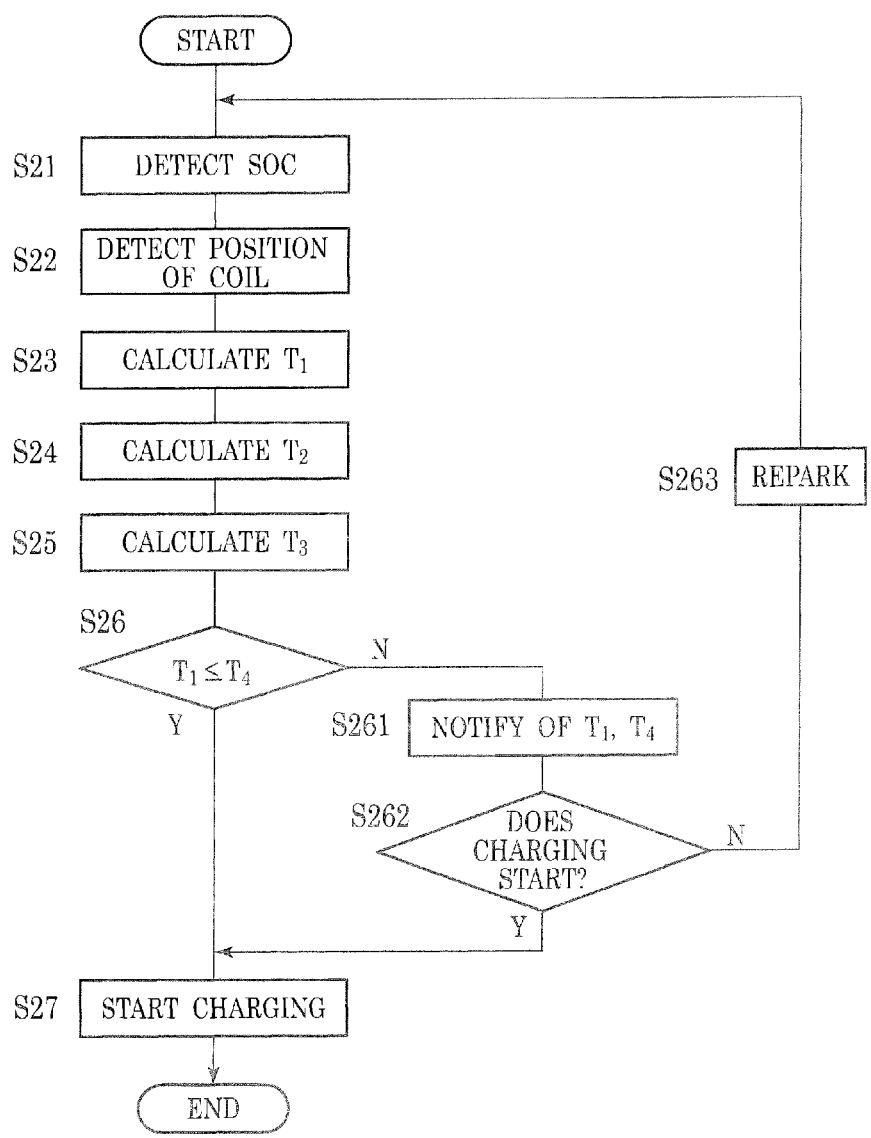
FIG. 12 is a flowchart illustrating a control procedure of the non-contact charging system illustrated in FIG. 11.

Next, a control procedure of the non-contact charging system of the third embodiment will be described with reference to FIG. 12. FIG. 12 is a flowchart illustrating the control procedure of the non-contact charging system of the third embodiment. When control by the non-contact charging system of the third embodiment is started, control operations of steps S21 to S24 are performed. Since the control operations of steps S21 to S24 are the same as the control operations of steps S11 to S14 according to the second embodiment, description of the control operations will be omitted. After step S24, the consumption calculation unit 707 calculates the amount of the battery 5 consumed by parking the vehicle over again to move the power receiving coil 1B to the position corresponding to the power transmitting coil 1A. Then, the charging time calculation unit 705 calculates the charging time ($T_3$) for charging the capacity of the battery corresponding to the amount of the battery consumed (at step S25). At step S26, the ECU 7 causes the charging time calculation unit 705 to calculate the charging time ($T_4$) by adding the charging time ($T_3$) to the charging time ($T_2$), and compares the charging time ($T_1$) with the charging time ($T_4$).

When the charging time ($T_1$) is equal to or less than the charging time ($T_4$), a shorter charging time can be achieved by performing the charging in the present parked position of the vehicle, rather than by parking the vehicle over again, and thus, under control of the ECU 7, the charge control unit 704 sets charging power according to the SOC of the battery 5 and electric power received by the power receiving coil 1B and supplies the charging power to the battery 5 thereby to start the charging of the battery 5 (at step S27).

Meanwhile, when the charging time ($T_1$) is longer than the charging time ($T_4$), a shorter charging time can be achieved by parking the vehicle over again in its ideal parked position, and thus, at step S261, the time notification unit 706 notifies the vehicle occupant of the charging time ($T_1$) and the charging time ($T_4$) by displaying the charging time ($T_1$) and the charging time ($T_4$) on the display or the like of the navigation system. At step S262, the vehicle occupant determines whether or not to perform the charging which takes the charging time ($T_1$). When the vehicle occupant determines that the charging of the battery 5 can take the charging time ($T_1$) and the vehicle occupant operates the charge start button (unillustrated) or the like to start the charging, the control moves on to step S27. When the vehicle occupant desires and determines to perform the charging which takes the charging time ($T_4$) shorter than the charging time ($T_1$), the driver parks the vehicle over again at step S263, and the control returns to step S21.

Then, the SOC of the battery 5 reaches a state of full charge, and the control by the non-contact charging system of the third embodiment comes to an end.

As described above, in the non-contact charging device of the third embodiment, the consumption calculation unit 707 calculates the amount of the battery 5 consumed by parking the vehicle having the vehicle-side unit 200 over again to move the power receiving coil 1B to the position corresponding to the power transmitting coil 1A, and the charging time ($T_3$) for charging the capacity of the battery corresponding to the amount of the battery consumed is calculated. This enables calculating the charging time in the case of the reparking of the vehicle, allowing for the amount of the battery 5 consumed by parking the vehicle over again in its ideal parked position. Also, in the third embodiment, comparison of the charging time ($T_1$) with the charging time ($T_4$) enables seeing whether or not the vehicle is to be parked over again in order to achieve a shorter charging time, thus achieving a reduction in the total charging time.

Also, in the third embodiment, the charging time calculation unit 705 calculates the charging time ($T_4$) by adding the charging time ($T_3$) to the charging time ($T_2$), and, when the charging time ($T_4$) is shorter than the charging time ($T_1$), the time notification unit 706 provides notification of the charging time ($T_1$) and the charging time ($T_4$). Thereby, in the third embodiment, the user can recognize that a shorter charging time can be achieved by parking the vehicle over again, and also, the user can determine whether or not to park the vehicle over again according to the user's desired charging time. As a result, the third embodiment can improve the user's convenience.

Also, in the third embodiment, when the charging time ($T_4$) is longer than the charging time ($T_1$), the charging is started in the position of the power transmitting coil 1A relative to the position of the power receiving coil 1B in which position displacement between the coils occurs. Thereby, when a shorter charging time can be achieved by performing the charging in the present parked position of the vehicle rather than by parking the vehicle over again, the charging can be started without parking the vehicle over again, and thus, the user's convenience can be improved.

Incidentally, in the third embodiment, when the vehicle is parked over again, output of a drive motor (unillustrated) of the vehicle may be limited to minimize battery consumption by the reparking of the vehicle. This facilitates estimation of battery consumption time. Further, easier estimation is achieved by automating the reparking of the vehicle.

The consumption calculation unit 707 corresponds to a "consumption calculation means" of the present invention.

[Fourth Embodiment]

Figure 13:
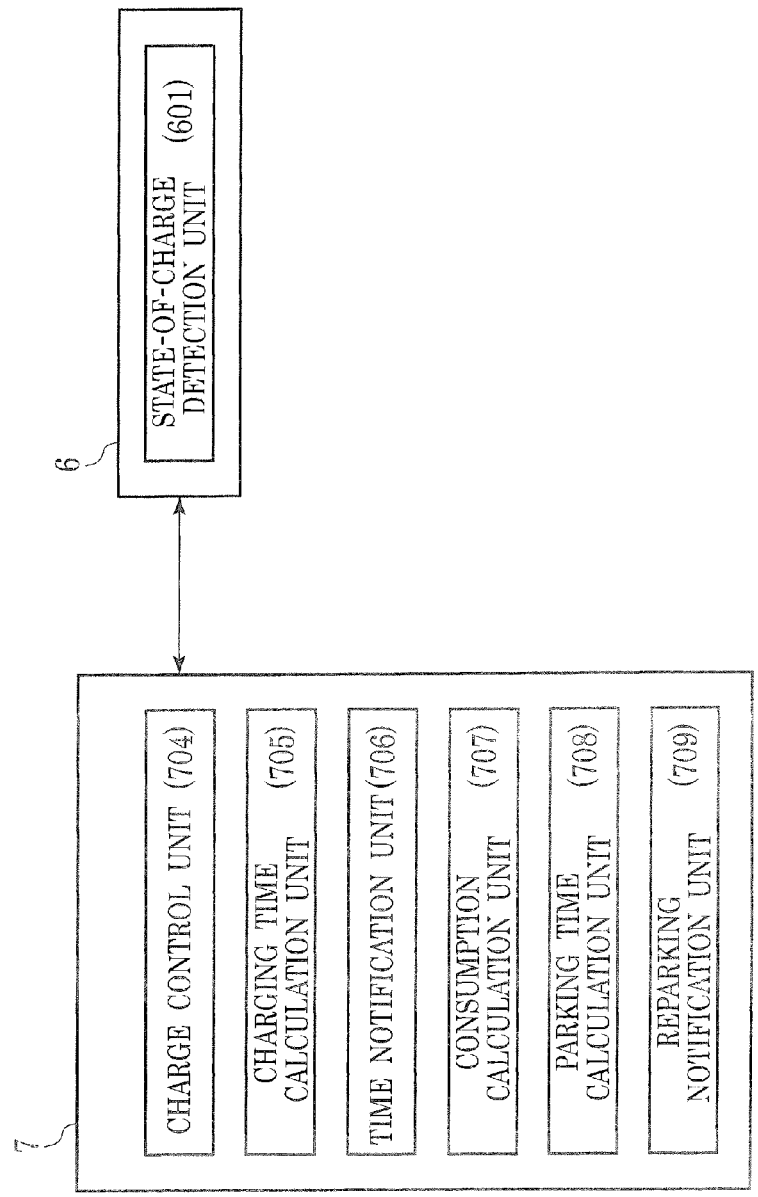
FIG. 13 is a block diagram of a battery controller and an electronic control unit of a non-contact charging system according to a further embodiment of the present invention.

FIG. 13 is a block diagram illustrating a non-contact charging system according to a further embodiment of the invention. The fourth embodiment is different from the above-mentioned second embodiment in including the consumption calculation unit 707, a parking time calculation unit 708, and a reparking notification unit 709. The remaining configuration is the same as that of the above-mentioned second embodiment, and description of the second and third embodiments will be incorporated as appropriate.

As illustrated in FIG. 13, the ECU 7 includes the charge control unit 704, the charging time calculation unit 705, the time notification unit 706, the consumption calculation unit 707, the parking time calculation unit 708, and the reparking notification unit 709. The parking time calculation unit 708 calculates parking time ($T_p$) for moving the vehicle having the vehicle-side unit 200 from its present parked position to park the vehicle in its ideal parked position. Under a predetermined condition, the reparking notification unit 709 provides notification to the vehicle occupant to urge him or her to park the vehicle over again. The notification is provided for example by displaying the notification on a display unit or the like of the navigation system. When the driver parks the vehicle over again to adjust the positions of the power transmitting coil 1A and the power receiving coil 1B, the parking time ($T_p$) for moving the vehicle is required. Then, charging time for charging to full charge by parking the vehicle over again in its ideal position with respect to a position in which position displacement between the coils occurs may be set allowing also for the parking time ($T_p$).

In the fourth embodiment, therefore, the parking time calculation unit 708 calculates the parking time ($T_p$), and the charging time calculation unit 705 calculates charging time ($T_5$) by adding the charging time ($T_3$) and the parking time ($T_p$) to the charging time ($T_2$). When the vehicle is parked and position displacement between the coils occurs, the charging time for fully charging the battery 5 is the charging time ($T_1$) calculated by the charging time calculation unit 705. Also, when the vehicle is parked over again in its ideal parked position by being moved from its parked position in which the position displacement between the coils occurs, the charging time ($T_5$) for fully charging the battery 5 is calculated by the charging time calculation unit 705 adding the charging time ($T_3$) and the parking time ($T_p$) to the charging time ($T_2$).

Incidentally, before the vehicle is parked over again, the parking time calculation unit 708 calculates the parking time ($T_p$). Specifically, the traveling path through which the vehicle is parked over again in its ideal parked position by being moved from its parked position in which the position displacement between the coils occurs is calculated by using the optimum route calculation system or the like used in the navigation system, the obstacle avoidance control, or the like, and thus, before the vehicle is parked over again, the parking time calculation unit 708 can calculate the parking time ($T_p$) from the traveling path and a preset average speed for parking.

Then, the ECU 7 compares the charging time ($T_1$) with the charging time ($T_5$). When the charging time ($T_1$) is longer than the charging time ($T_5$), a shorter charging time can be achieved by the driver parking the vehicle over again in its ideal parked position. Therefore, when the charging time ($T_1$) is longer than the charging time ($T_5$), under control of the ECU 7, while the time notification unit 706 provides notification of the charging time ($T_1$) and the charging time ($T_5$), the reparking notification unit 709 provides notification to park the vehicle over again.

Thereby, in the fourth embodiment, the charging time ($T_1$) in the present parked position of the vehicle and the charging time ($T_5$) in the ideal position allowing for the amount of the battery 5 consumed by parking the vehicle over again and the parking time ($T_p$) are calculated, and the battery 5 is charged according to a result of comparison between the charging time ($T_1$) and the charging time ($T_5$).

Figure 14:
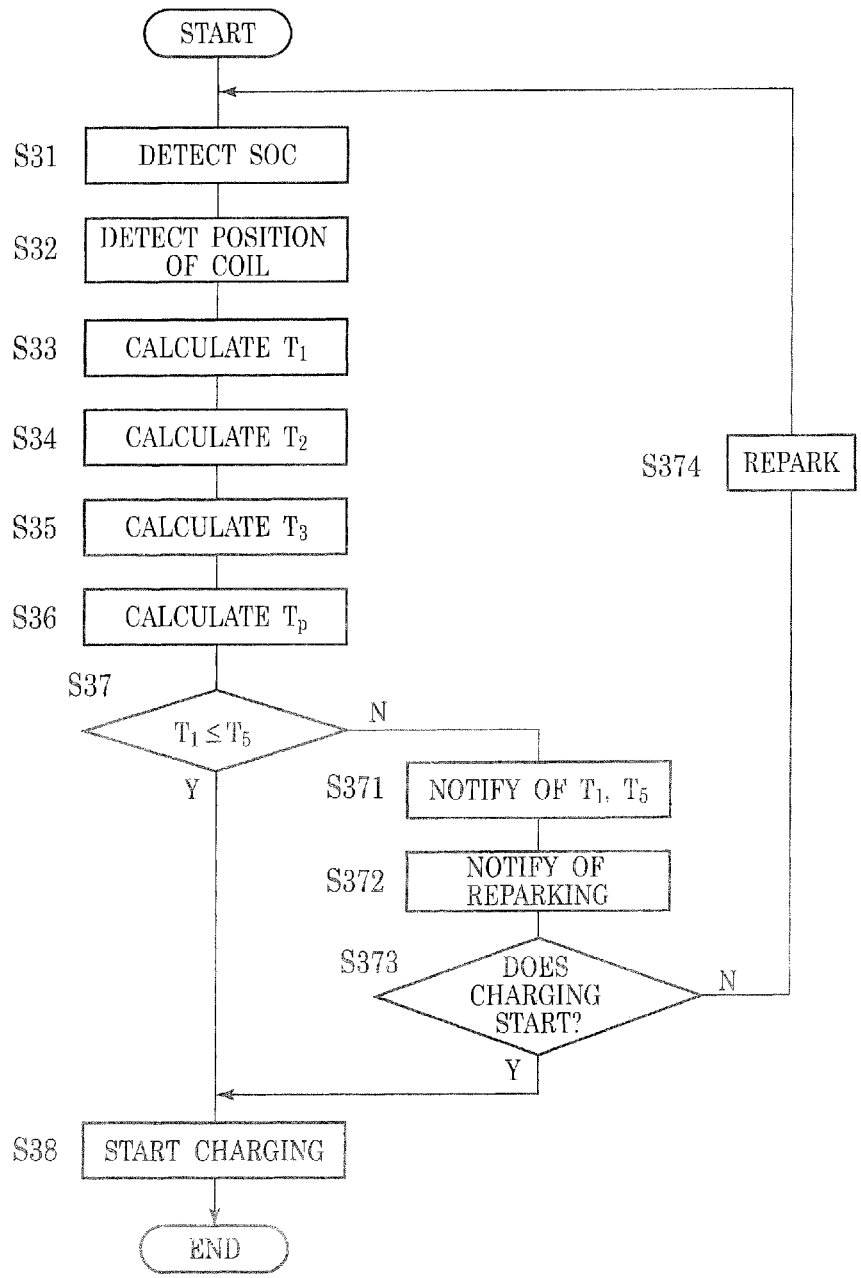
FIG. 14 is a flowchart illustrating a control procedure of the non-contact charging system illustrated in FIG. 13.

Next, a control procedure of the non-contact charging system of the fourth embodiment will be described with reference to FIG. 14. FIG. 14 is a flowchart illustrating the control procedure of the non-contact charging system of the fourth embodiment. When control by the non-contact charging system of the fourth embodiment is started, control operations of steps S31 to S35 are performed. Since the control operations of steps S31 to S35 are the same as the control operations of steps S21 to S25 according to the third embodiment, description of the control operations will be omitted. After step S35, the parking time calculation unit 708 calculates the parking time ($T_p$) for parking the vehicle over again to move the power receiving coil 1B to the position corresponding to the power transmitting coil 1A (at step S36). At step S37, the ECU 7 causes the charging time calculation unit 705 to calculate the charging time ($T_5$) by adding the charging time ($T_3$) and the parking time ($T_p$) to the charging time ($T_2$), and compares the charging time ($T_1$) with the charging time ($T_5$).

When the charging time ($T_1$) is equal to or less than the charging time ($T_5$), a shorter charging time can be achieved by performing the charging in the present parked position of the vehicle, rather than by parking the vehicle over again, and thus, under control of the ECU 7, the charge control unit 704 sets charging power according to the SOC of the battery 5 and electric power received by the power receiving coil 1B and supplies the charging power to the battery 5 thereby to start the charging of the battery 5 (at step S38).

Meanwhile, when the charging time ($T_1$) is longer than the charging time ($T_5$), a shorter charging time can be achieved by parking the vehicle over again in its ideal parked position, and thus, at step S371, the time notification unit 706 notifies the vehicle occupant of the charging time ($T_1$) and the charging time ($T_5$) by displaying the charging time ($T_1$) and the charging time ($T_5$) on the display or the like of the navigation system. Also, at step S372, the reparking notification unit 709 notifies the vehicle occupant to park the vehicle over again.

At step S373, the vehicle occupant determines whether or not to perform the charging which takes the charging time ($T_1$). When the vehicle occupant determines that the charging of the battery 5 can take the charging time ($T_1$) and the vehicle occupant operates the charge start button (unillustrated) or the like to start the charging, the control moves on to step S38. When the vehicle occupant desires and determines to perform the charging which takes the charging time ($T_5$) shorter than the charging time ($T_1$), the driver parks the vehicle over again at step S374, and the control returns to step S31.

Then, the SOC of the battery 5 reaches a state of full charge, and the control by the non-contact charging system of the fourth embodiment comes to an end.

As described above, in the non-contact charging device of the fourth embodiment, the parking time calculation unit 708 calculates the parking time ($T_p$) for parking the vehicle having the vehicle-side unit 200 over again to move the power receiving coil 1B to the position corresponding to the power transmitting coil 1A. This enables calculating the charging time in the case of the reparking of the vehicle, allowing for the parking time for parking the vehicle over again in its ideal parked position. Also, in the fourth embodiment, comparison of the charging time ($T_1$) with the charging time ($T_5$) enables seeing whether or not the vehicle is to be parked over again in order to achieve a shorter charging time, thus achieving a reduction in the total charging time.

Also, in the fourth embodiment, the charging time calculation unit 705 calculates the charging time ($T_5$) by adding the charging time ($T_3$) and the parking time ($T_p$) to the charging time ($T_2$), and, when the charging time ($T_5$) is shorter than the charging time ($T_1$), the time notification unit 706 provides notification of the charging time ($T_1$) and the charging time ($T_5$). Thereby, in the fourth embodiment, the user can recognize that a shorter charging time can be achieved by parking the vehicle over again, and also, the user can determine whether or not to park the vehicle over again according to the user's desired charging time. As a result, the fourth embodiment can improve the user's convenience.

Also, in the fourth embodiment, when the charging time ($T_5$) is shorter than the charging time ($T_1$), the reparking notification unit 709 notifies the user to park the vehicle over again. Thereby, in the fourth embodiment, the user can recognize that a shorter charging time can be achieved by parking the vehicle over again, and also, the user can determine whether or not to park the vehicle over again according to the user's desired charging time. As a result, the fourth embodiment can improve the user's convenience.

Also, in the fourth embodiment, when the charging time ($T_5$) is longer than the charging time ($T_1$), the charging is started in the position of the power transmitting coil 1A relative to the position of the power receiving coil 1B in which position displacement between the coils occurs. Thereby, when a shorter charging time can be achieved by performing the charging in the present parked position of the vehicle rather than by parking the vehicle over again, the charging can be started without parking the vehicle over again, and thus, the user's convenience can be improved.

The parking time calculation unit 708 corresponds to a "parking time calculation means" of the present invention, and the reparking notification unit 709 corresponds to a "reparking notification means."

[Fifth Embodiment]

Figure 15:
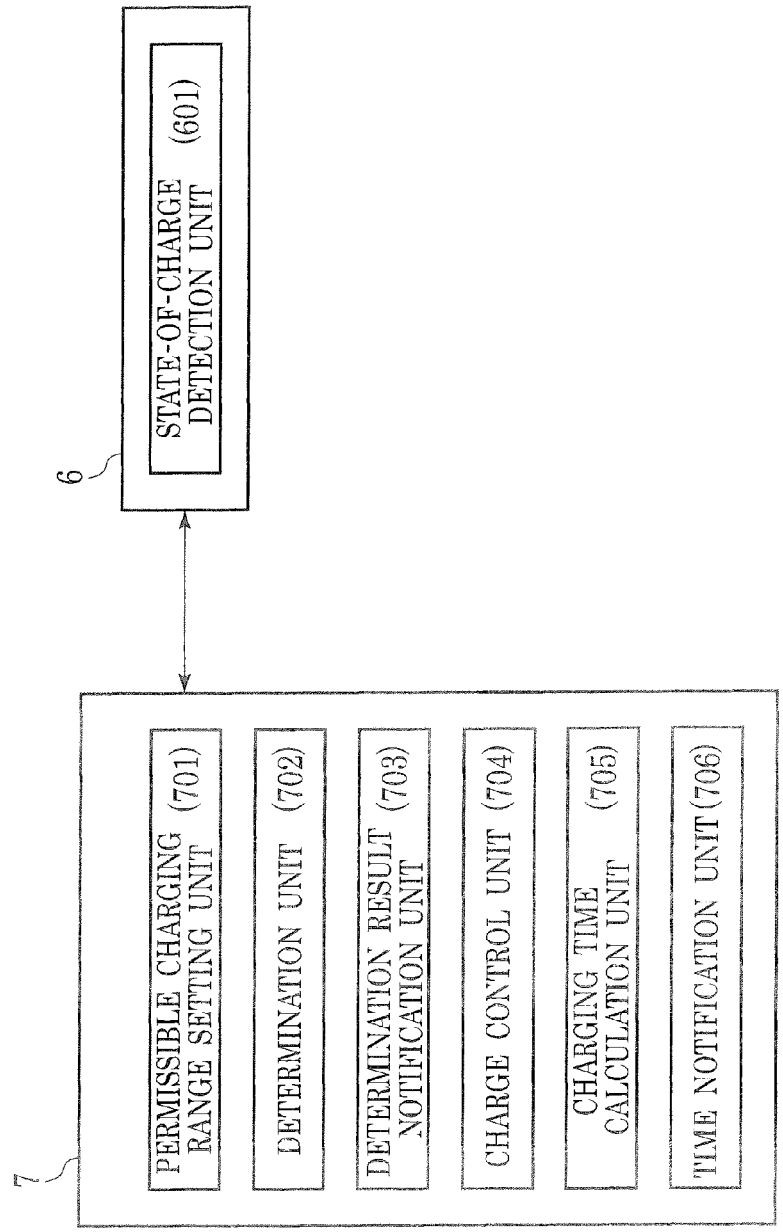
FIG. 15 is a block diagram of a battery controller and an electronic control unit of a non-contact charging system according to a still further embodiment of the present invention.

FIG. 15 is a block diagram illustrating a non-contact charging system according to a still further embodiment of the invention. The fifth embodiment is different from the above-mentioned first embodiment in including the charging time calculation unit 705 and the time notification unit 706. Since the remaining configuration is the same as that of the above-mentioned first embodiment, description thereof will be incorporated.

As illustrated in FIG. 15, the ECU 7 includes the permissible charging range setting unit 701, the determination unit 702, the determination result notification unit 703, the charge control unit 704, the charging time calculation unit 705, and the time notification unit 706. The permissible charging range setting unit 701 sets a permissible charging range according to the SOC. The charging time calculation unit 705 calculates the charging time ($T_1$) for charging to full charge from the position of the power transmitting coil 1A relative to the position of the power receiving coil 1B and the SOC. Also, the charging time calculation unit 705 calculates the charging time ($T_2$) in the case where the power receiving coil 1B is located in the position corresponding to the position of the power transmitting coil 1A, from the SOC. The charging time ($T_1$) indicates the charging time in the positions of the coils in the present parked position of the vehicle, and the charging time ($T_2$) indicates the charging time in the positions of the coils in the ideal parked position of the vehicle. In the ECU 7, the time difference ($\Delta Tc$) is preset for comparison with the time difference ($\Delta T$) between the charging time ($T_1$) and the charging time ($T_2$). The time difference ($\Delta Tc$) indicates the time difference from the charging time allowed for the charging time ($T_2$).

Here, the permissible charging range and the time difference ($\Delta Tc$) indicate the permitted amount of position displacement between the coils with respect to the ideal position of the vehicle, in terms of spatial range and time, respectively, and the time difference ($\Delta Tc$) is set so that the permitted amount of position displacement between the coils is larger, as compared to the permissible charging range. For example, it is assumed that, when the SOC has a certain value, the position of the power transmitting coil 1A is detected falling outside the permissible charging range; even in this case, when the time difference ($\Delta T$) between the charging time ($T_1$) and the charging time ($T_2$) is smaller than the time difference ($\Delta Tc$), a determination is made that the amount of position displacement between the coils is smaller than the permitted amount, and the charging is permitted.

Figure 16:
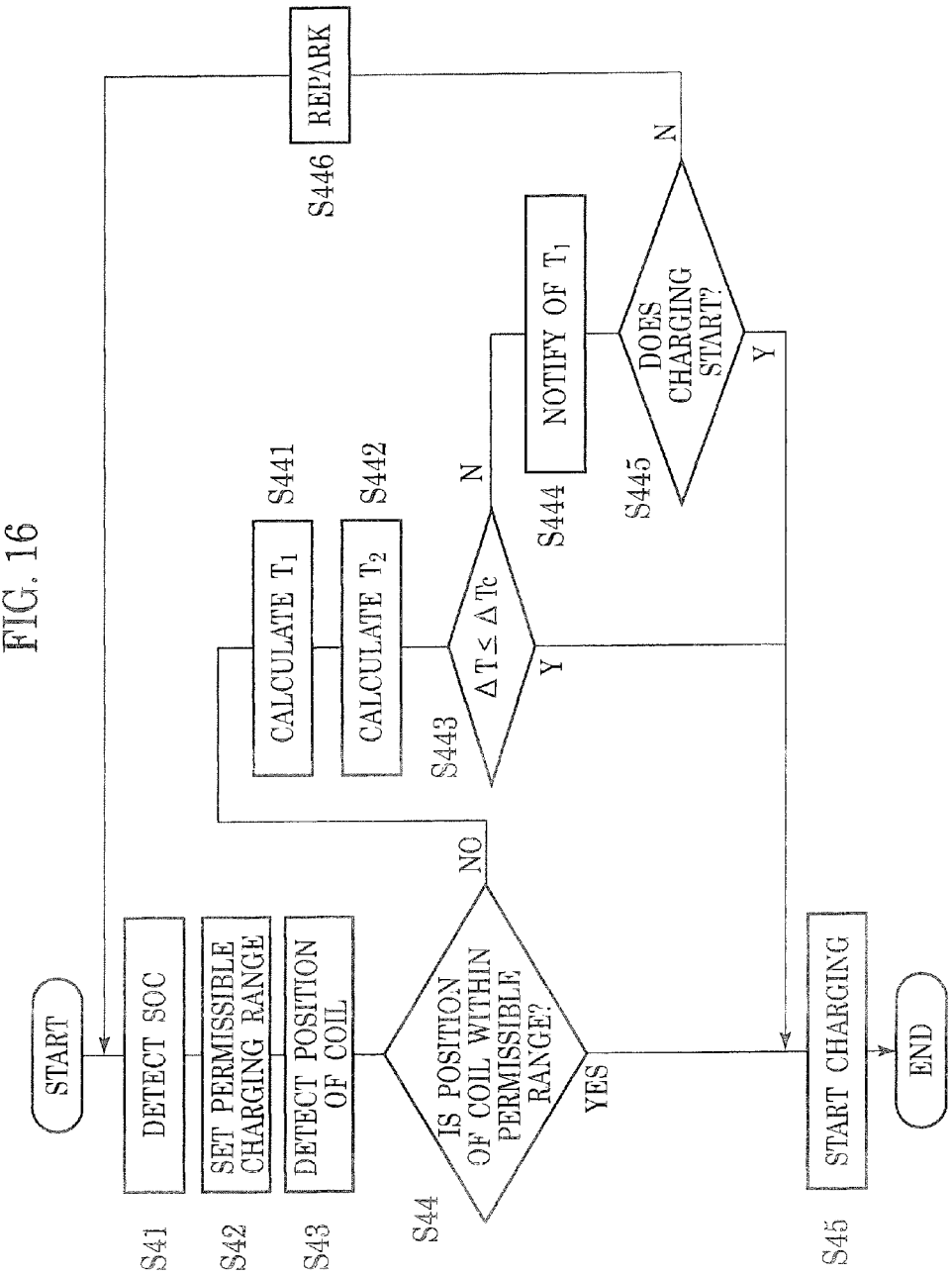
FIG. 16 is a flowchart illustrating a control procedure of the non-contact charging system illustrated in FIG. 15.

Next, a control procedure of the non-contact charging system of the fifth embodiment will be described with reference to FIG. 16. FIG. 16 is a flowchart illustrating the control procedure of the non-contact charging system of the fifth embodiment. When control by the non-contact charging system of the fifth embodiment is started, at step S41, the state-of-charge detection unit 601 detects the SOC of the battery 5 and transmits information on the detected SOC to the ECU 7. At step S42, the permissible charging range setting unit 701 sets a permissible charging range according to the detected SOC. At step S43, the ECU 7 detects the position of the power transmitting coil 1A through the ground-side communication device 8A and the vehicle-side communication device 8B. At step S44, the determination unit 702 determines whether or not the position of the power transmitting coil 1A lies within the permissible charging range.

When the position of the power transmitting coil 1A lies within the permissible charging range, at step S45, the charge control unit 704 sets charging power according to the SOC of the battery 5 and electric power received by the power receiving coil 1B and supplies the charging power to the battery 5 thereby to start the charging of the battery 5.

Meanwhile, when the position of the power transmitting coil 1A does not lie within the permissible charging range, at step S441, the charging time calculation unit 705 calculates the charging time ($T_1$) according to the detected position of the power transmitting coil 1A and the detected SOC. At step S442, the charging time calculation unit 705 calculates the charging time ($T_2$) according to the SOC. At step S443, the ECU 7 calculates the time difference ($\Delta T$) between the charging time ($T_1$) and the charging time ($T_2$) and compares the time difference ($\Delta T$) with the preset time difference ($\Delta Tc$). When the time difference ($\Delta T$) is equal to or less than the time difference ($\Delta Tc$), the ECU 7 determines that the charging within the preset allowed time is possible even if the position of the coil lies outside the permissible charging range, and the charge control unit 704 sets charging power according to the SOC of the battery 5 and electric power received by the power receiving coil 1B and supplies the charging power to the battery 5 thereby to start the charging of the battery 5 (at step S45).

Meanwhile, when the time difference ($\Delta T$) is larger than the time difference ($\Delta Tc$), the ECU 7 determines that the charging within the preset allowed time is impossible, and the time notification unit 706 notifies the vehicle occupant of the charging time ($T_1$) by displaying the charging time ($T_1$) on the display or the like of the navigation system (at step S444). At step S445, the vehicle occupant determines whether or not to perform the charging which takes the charging time ($T_1$). When the vehicle occupant determines that the charging of the battery 5 can take the charging time ($T_1$) and the vehicle occupant operates the charge start button (unillustrated) or the like to start the charging, the control moves on to step S45. When the vehicle occupant determines not to perform the charging which takes the charging time ($T_1$), the driver parks the vehicle over again at step S446, and the control returns to step S41.

Then, the SOC of the battery 5 reaches a state of full charge, and the control by the non-contact charging system of the fifth embodiment comes to an end.

As described above, the non-contact charging device of the fifth embodiment includes the power receiving coil 1B, the vehicle-side electrical circuit 2B, the battery 5, the state-of-charge detection unit 601, the communication devices 8A, 8B, the permissible charging range setting unit 701, and the charging time calculation unit 705, and the permissible charging range indicating the range of the position of the power transmitting coil 1A relative to the position of the power receiving coil 1B, in which the charging of the battery is permitted, is set according to the SOC, and also, the charging time ($T_1$) for the battery 5 is calculated according to the detected position of the power transmitting coil 1A and the SOC. In the fifth embodiment, the permissible charging range and the charging time are calculated and whether or not the charging is permitted is determined based on both the permissible charging range and the charging time, and thus, determination accuracy can be improved, so that the user's convenience can be improved.

Incidentally, the non-contact charging system of the fifth embodiment may be configured as a system in which the charging time ($T_3$) and the charging time ($T_4$) are calculated and control operations of step S26, step S27 and steps S261 to S263 are added, as is the case with the non-contact charging system according to the third embodiment, or may be configured as a system in which the charging time ($T_5$) and the parking time ($T_p$) are calculated and control operations of step S37, step S38 and steps S371 to S373 are added.

REFERENCE SIGNS LIST 100 ground-side unit
1A power transmitting coil
2A ground-side electrical circuit
3 ECU
4 system power supply
8A ground-side communication device
200 vehicle-side unit
1B power receiving coil
2B vehicle-side electrical circuit
5 battery
6 battery controller
7 ECU
8B vehicle-side communication device
601 state-of-charge detection unit
701 permissible charging range setting unit
702 determination unit
703 determination result notification unit
704 charge control unit
705 charging time calculation unit
706 time notification unit
707 consumption calculation unit
708 parking time calculation unit
709 reparking notification unit

The invention claimed is:

1. A non-contact charging device comprising:
a power receiving device having at least a power receiving coil which receives electric power from a power transmitting coil in a non-contact manner by magnetic coupling;
a battery which is charged by the electric power;
a state-of-charge detection unit for detecting the state of charge of the battery;
a permissible charging range setting unit for setting a permissible charging range indicating the range of the position of the power transmitting coil relative to the position of the power receiving coil, in which the charging of the battery is permitted, according to the state of charge detected by the state-of-charge detection unit; and
a charge control unit for controlling charging power for the battery according to the state of charge detected by the state-of-charge detection unit,
wherein the permissible charging range setting unit sets the permissible charging range wider as the state of charge is higher.

2. The non-contact charging device according to claim 1, wherein
the charge control unit charges the battery by the electric power received by the power receiving coil, which is determined by displacement of the position of the power receiving coil relative to the position of the power transmitting coil, and limits the charging power by reducing the charging power as the state of charge becomes higher.

3. The non-contact charging device according to claim 1, comprising:
a temperature detection unit for detecting a temperature of the battery or a temperature in a vehicle having the power receiving device,
wherein the permissible charging range setting unit sets the permissible charging range according to the temperature detected by the temperature detection unit.

4. The non-contact charging device according to claim 1, further comprising:
a position detection unit for detecting the position of the power transmitting coil;
a determination unit for determining whether or not the charging of the battery is permitted; and
a determination result notification unit for providing notification of results determined by the determination unit,
wherein the determination unit determines that the charging of the battery is permitted, when the position of the power transmitting coil detected by the position detection unit lies Within the permissible charging range.

5. The non-contact charging device according to claim 1, further comprising:
a position detection unit for detecting the position of the power transmitting coil; and
a charging time calculation unit for calculating a first charging time for the battery according to the state of charge detected by the state-of-charge detection unit, and a first position of the power transmitting coil detected by the position detection unit.

6. The non-contact charging device according to claim 1, wherein
the charge control unit reduces the charging power in a stepwise fashion as the state of charge becomes higher.

* * * * *